(12) United States Patent  
Huang et al.

(10) Patent No.: US 8,885,758 B2
(45) Date of Patent: Nov. 11, 2014

(54) DATA STREAM PROCESSING METHOD, DEVICE, AND SYSTEM

(71) Applicant: Huawei Technologies Co., Ltd., Shenzhen (CN)

(72) Inventors: Huang Huang, Shenzhen (CN); Kin Nang Lau, Shenzhen (CN); Yinggang Du, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 13/712,671

(22) Filed: Dec. 12, 2012

(65) Prior Publication Data

US 2013/0101009 A1    Apr. 25, 2013

Related U.S. Application Data

(63) Continuation of application No. PCT/CN2011/075601, filed on Jun. 10, 2011.

(30) Foreign Application Priority Data

Jun. 12, 2010  (CN) .......................... 2010 1 0200687

(51) Int. Cl.
  *H04B 15/00*  (2006.01)
  *H04B 7/04*  (2006.01)
  *H04B 1/62*  (2006.01)
  *H04L 25/03*  (2006.01)
  *H04L 27/01*  (2006.01)

(52) U.S. Cl.
  CPC ............... *H04B 1/62* (2013.01); *H04B 7/0413* (2013.01); *H04L 25/03343* (2013.01); *H04L 27/01* (2013.01)
  USPC ........... 375/285; 375/232; 375/267; 375/299; 375/260; 375/264; 375/347; 375/346; 455/63.1; 455/101; 455/102; 455/103; 455/132

(58) Field of Classification Search
  USPC ......... 375/232, 285, 267, 299, 260, 264, 347, 375/346; 455/63.1, 101–103, 132
  See application file for complete search history.

(56) References Cited

U.S. PATENT DOCUMENTS 4,649,416 A   3/1987   Borkowski et al.
5,118,953 A   6/1992   Ota et al.
(Continued)

FOREIGN PATENT DOCUMENTS

CN    2514548 Y    10/2002
CN    1726638 A    1/2006
(Continued)

OTHER PUBLICATIONS

Vito et al. An improved method for classification and metrological characterization of disturbance on QAM signals;Feb. 2006; IEEE transactions on instrumentation and measurement;vol. 55, No. 1;pp. 26-34.*

(Continued)

*Primary Examiner* — Rahel Guarino
(74) *Attorney, Agent, or Firm* — Huawei Technologies Co., Ltd.

(57) ABSTRACT

The present invention provides a data stream processing method, device, and system. The data stream processing method includes: using a precoding parameter to perform precoding processing on an $l^{th}$ to-be-sent data stream of a current $k^{th}$ transmitting device, where the $l^{th}$ to-be-sent data stream includes a lattice point data stream mapped to a lattice grid; and sending the precoded $l^{th}$ to-be-sent data stream to a $k^{th}$ receiving device, where both l and k are positive integers. The technical solutions in the embodiments of the present invention can be helpful for filtering out interference, exactly complies with an actual processing procedure of an interfering data stream, and have strong practicability.

21 Claims, 9 Drawing Sheets

(56) References Cited

U.S. PATENT DOCUMENTS

| | | | |
|---|---|---|---|
| 5,623,231 | A | 4/1997 | Mohwinkel et al. |
| 6,242,985 | B1 | 6/2001 | Shinomiya |
| 8,009,757 | B2 * | 8/2011 | Mroueh et al. ............ 375/295 |
| 8,140,070 | B2 * | 3/2012 | Ashikhmin et al. .......... 455/424 |
| 2003/0117219 | A1 | 6/2003 | Yamamoto et al. |
| 2004/0001427 | A1 | 1/2004 | Belotserkovsky et al. |
| 2004/0113697 | A1 | 6/2004 | Pengelly et al. |
| 2004/0145034 | A1 | 7/2004 | Fujioka et al. |
| 2006/0145757 | A1 | 7/2006 | Kim et al. |
| 2008/0095259 | A1 | 4/2008 | Dyer et al. |
| 2008/0207238 | A1 | 8/2008 | Tosato |
| 2009/0051438 | A1 | 2/2009 | Okubo et al. |
| 2010/0148862 | A1 | 6/2010 | Woo |

FOREIGN PATENT DOCUMENTS

| | | |
|---|---|---|
| CN | 1822492 A | 8/2006 |
| CN | 101106358 A | 1/2008 |
| CN | 101151798 A | 3/2008 |
| CN | 101218759 A | 7/2008 |
| CN | 101459488 A | 6/2009 |
| CN | 101577526 A | 11/2009 |
| WO | WO 01/03289 A1 | 1/2001 |
| WO | WO 01/24271 A1 | 4/2001 |
| WO | WO 2006/089614 A1 | 8/2006 |

OTHER PUBLICATIONS

Office Action issued in corresponding Chinese Patent Application No. 201010281316.4, mailed Jun. 4, 2012.
Office Action issued in corresponding Chinese Patent Application No. 201010281316.4, mailed Nov. 27, 2012.
Written Opinion of the International Searching Authority issued in corresponding PCT Patent Application No. PCT/CN2011/075180, mailed Sep. 15, 2011.
International Search Report issued in corresponding PCT Patent Application No. PCT/CN2011/075180, mailed Sep. 15, 2011.
Chinese Search Report issued in corresponding Chinese Patent Application No. 201010200687.5; dated May 24, 2013.
Ma, Xiaoli et al. "Lattice Reduction Aided Linear Equalizer Design for Linear Complex-Field Coded OFDM Systems" Military Communications Conference, 2005. MILCOM 2005. IEEE:1-7.
Xu, Dao-feng et al, "Tomlinson-Harashima Precoding for Multiuser MIMO Systems" Journal of Electronics and information Technoglogy. Mar. 2009:657-660.
Extended European Search Report issued in corresponding European Patent Application No. 11783067.9, mailed Jun. 18, 2013, 15 pages.
Office Action issued in corresponding Chinese Patent Application No. 201010281316.4, mailed Apr. 11, 2013, 11 pages.
Kang et al., "30.3% PAE HBT Doherty Power Amplifier for 2.5~2.7 GHz Mobile WiMAX" IEEE 2010, 4 pages.
Kang et al., "Input Power Dividing of Doherty Power Amplifiers for Handset Applications" IMS, IEEE 2009, 4 pages.
Kim et al., "Doherty Linear Power Amplifiers for Mobile Handset Applications" Proceedings of Asia-Pacific Microwave Conference 2006, 8 pages.
Takenaka et al., "A 240 W Doherty GaAs Power FET Amplifier with High Efficiency and Low Distortion for W-CDMA Base Stations" IEEE MTT-S Digest 2004, 4 pages.
Takenaka et al., "L/S-band 140W Push-Pull Power AlGaAs/GaAs HFETs for Digital Cellular Base Stations" IEEE 1998, 4 pages.
Yu et al., "Fully Integrated Doherty Power Amplifiers for 5 GHz Wireless-LANs" Radio Frequency Integrated Circuits Symposium, IEEE 2006, 4 pages.
International Search Report issued in corresponding PCT Patent Application No. PCT/CN2011/075601, mailed Sep. 15, 2011.
Written Opinion of the International Searching Authority issued in corresponding PCT Patent Application No. PCT/CN2011/075601, mailed Sep. 15, 2011.
Extended European Search Report issued in corresponding European Patent Application No. 11791953.0, mailed Jul. 31, 2013, 7 pages.

* cited by examiner

DATA STREAM PROCESSING METHOD, DEVICE, AND SYSTEM

CROSS-REFERENCE TO RELATED APPLICATIONS

This application is a continuation of International Application No. PCT/CN2011/075601, filed on Jun. 10, 2011, which claims priority to Chinese Patent Application No. 201010200687.5, filed on Jun. 12, 2010, both of which are hereby incorporated by reference in their entireties.

FIELD OF THE INVENTION

Embodiments of the present invention relate to the field of radio communications technologies, and in particular, to a data stream processing method, device, and system.

BACKGROUND OF THE INVENTION

Interference is a hot topic of research in radio communications technologies. To filter out interference effectively, an interference alignment (Interference Alignment, hereinafter referred to as IA) method is generally used to eliminate interference, so as to obtain a target data stream that needs to be received by a receiver.

In a conventional IA method, IA processing is performed on a random signal sent by each transmitter, so that all interfering signals received by a receiver are aligned with a space of a smaller dimension, and then a received target data stream is obtained from a space of the remaining dimensions. In such a conventional IA method, a Gaussian symbol is generally used to simulate an interfering signal. This interference is random, and a corresponding interference space is unstructured, namely, irregular. With this IA method, the best degree of freedom (Degree of Freedom, hereinafter referred to as DoF) may be implemented.

To filter out interference by using an interference alignment method more effectively, a scholar proposes to use a lattice (Lattice) structure for IA processing, and use symmetric single input single output, hereinafter referred to as SISO) channels, namely, all cross channels have the same coefficient. This IA method can prove a border of the DoF.

In a process of implementing the present invention, the inventor finds that the prior art has at least the following problems: In the conventional IA method, a Gaussian symbol is generally used to simulate an interfering signal, and this interference is random, which does not meet a practical application. A method of using a Lattice for IA processing and using a SISO channel for implementation in the prior art is still under elementary theoretical research currently, and is not applicable in a practical signal processing procedure. Therefore, an IA processing method in the prior art does not have practicability.

SUMMARY OF THE INVENTION

Embodiments of the present invention provide a data stream processing method, device, and system to overcome a defect that an IA processing method cannot be put into a practical application in the prior art, and comply with an actual data stream processing procedure.

An embodiment of the present invention provides a data stream processing method, including:

using a precoding parameter to perform precoding processing on an $l^{th}$ to-be-sent data stream of a current $k^{th}$ transmitting device, where the $l^{th}$ to-be-sent data stream includes a lattice point data stream mapped to a lattice grid; and sending a precoded $l^{th}$ to-be-sent data stream to a corresponding $k^{th}$ receiving device, where both l and k are positive integers.

An embodiment of the present invention provides a data stream processing method, including:

receiving data streams, where the data streams include an $l^{th}$ data stream sent from a $k^{th}$ transmitting device and an aggregate interfering data stream other than the $l^{th}$ data stream;

solving aggregate interference for the data streams according to a pre-stored first equalization parameter and an aggregate interference alignment quantization parameter, so as to obtain the aggregate interfering data stream from the data streams; and processing the data streams according to a pre-stored second equalization parameter, an interference parameter, and the aggregate interfering data stream, so as to obtain the $l^{th}$ data stream.

An embodiment of the present invention further provides a transmitting device, including:

a first processing module, configured to use a precoding parameter to perform precoding processing on an $l^{th}$ to-be-sent data stream of a current $k^{th}$ transmitting device, where the $l^{th}$ to-be-sent data stream includes a lattice point data stream mapped to a lattice grid; and a first sending module, configured to send the precoded $l^{th}$ to-be-sent data stream to a corresponding $k^{th}$ receiving device, where both l and k are positive integers.

An embodiment of the present invention further provides a receiving device, including:

a first receiving module, configured to receive data streams, where the data streams include an $l^{th}$ data stream sent from a $k^{th}$ transmitting device and an aggregate interfering data stream other than the $l^{th}$ data stream;

a first processing module, configured to solve aggregate interference for the data streams according to a pre-stored first equalization parameter and an aggregate interference alignment quantization parameter, so as to obtain the aggregate interfering data stream from the data streams; and a second processing module, configured to process the data streams according to a pre-stored second equalization parameter, an interference parameter, and the aggregate interfering data stream, so as to obtain the $l^{th}$ data stream.

An embodiment of the present invention further provides a data stream processing system, including:

at least one transmitting device, configured to: use a precoding parameter to perform precoding processing on an $l^{th}$ to-be-sent data stream, where the $l^{th}$ to-be-sent data stream includes a lattice point data stream mapped to a lattice grid; and send the precoded $l^{th}$ to-be-sent data stream to a corresponding receiving device, where both l and k are positive integers; and at least one receiving device, configured to: receive data streams, where the data streams include an $l^{th}$ data stream and an aggregate interfering data stream other than the $l^{th}$ data stream; solve aggregate interference for the data streams according to a pre-stored first equalization parameter and an aggregate interference alignment quantization parameter, so as to obtain the aggregate interfering data stream from the data streams; and process the data streams according to a pre-stored second equalization parameter, an interference parameter, and the aggregate interfering data stream, so as to obtain the $l^{th}$ data stream.

With the data stream processing method, device, and system in the embodiments of the present invention, a data stream is processed by using an MIMO channel that is compliant with an actual signal processing procedure, which is helpful for filtering out interference and obtaining a target data stream. The technical solutions in the embodiments of the present invention exactly comply with an actual processing procedure of an interfering data stream and have strong practicability.

BRIEF DESCRIPTION OF THE DRAWINGS

To illustrate the technical solutions in the embodiments of the present invention or in the prior art more clearly, accompanying drawings required for describing the embodiments or the prior art are introduced briefly in the following. Apparently, the accompanying drawings in the following description are merely some embodiments of the present invention, and persons of ordinary skill in the art may also obtain other drawings according to these accompanying drawings without creative efforts.

DETAILED DESCRIPTION OF THE EMBODIMENTS

In order to make the objectives, technical solutions, and advantages of the present invention clearer, the technical solutions in the embodiments of the present invention are clearly and completely described in the following with reference to the accompanying drawings in the embodiments of the present invention. Apparently, the embodiments in the following description are merely a part rather than all of the embodiments of the present invention. Based on the embodiments of the present invention, all other embodiments obtained by persons of ordinary skill in the art without creative efforts shall fall within the protection scope of the present invention.

Figure 1:
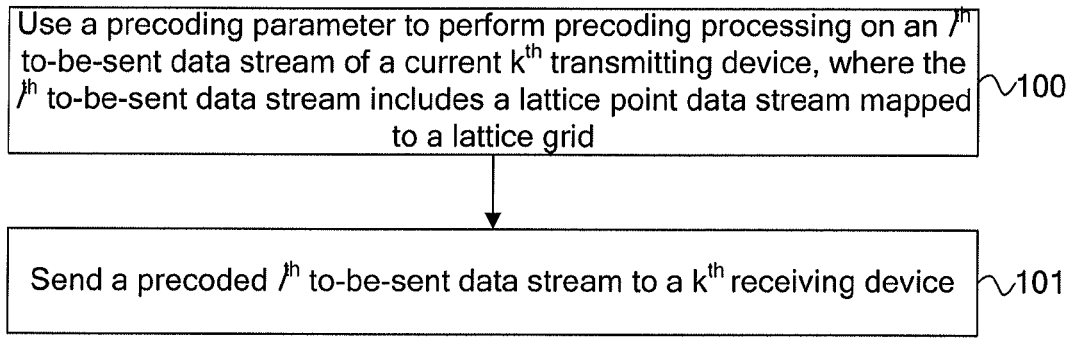
FIG. 1 is a flow chart of a data stream processing method according to Embodiment 1 of the present invention.

FIG. 1 is a flow chart of a data stream processing method according to Embodiment 1 of the present invention. An entity for executing the data stream processing method in this embodiment is a data stream transmitting device, which is referred to as a transmitting device. As shown in FIG. 1, the data stream processing method in this embodiment may include the following steps:

Step 100: Use a precoding parameter to perform precoding processing on an $l^{th}$ to-be-sent data stream of a current $k^{th}$ transmitting device, where the $l^{th}$ to-be-sent data stream includes a lattice point data stream mapped to a lattice grid.

To facilitate the description, it is assumed that in a K-pair complex Gaussian interference multi-input multi-output (multiple-input and multiple-output, herein after referred to as MIMO) channel system, each transmitting device has M antennas, and each receiving device has N antennas. In this way, $H_{km}$ may be used to represent a channel coefficient from an $m^{th}$ transmitting device to a $k^{th}$ receiving device in N×M MIMO complex channels; i, M, and N are all positive integers. In the case that channel state information (channel state information, hereinafter referred to as CSI) is not ideal, a channel coefficient estimated at a receiving device side may be expressed as $\hat{H}=H+\Delta$, where H is a true channel coefficient; $\Delta$ represents a CSI error; and $\hat{H}$ represents a channel coefficient with an error.

Herein a certain transmitting device such as the $k^{th}$ transmitting device is used as an object of research, namely, an execution entity in this embodiment is the $k^{th}$ transmitting device, where both k and l are positive integers.

Figure 2:
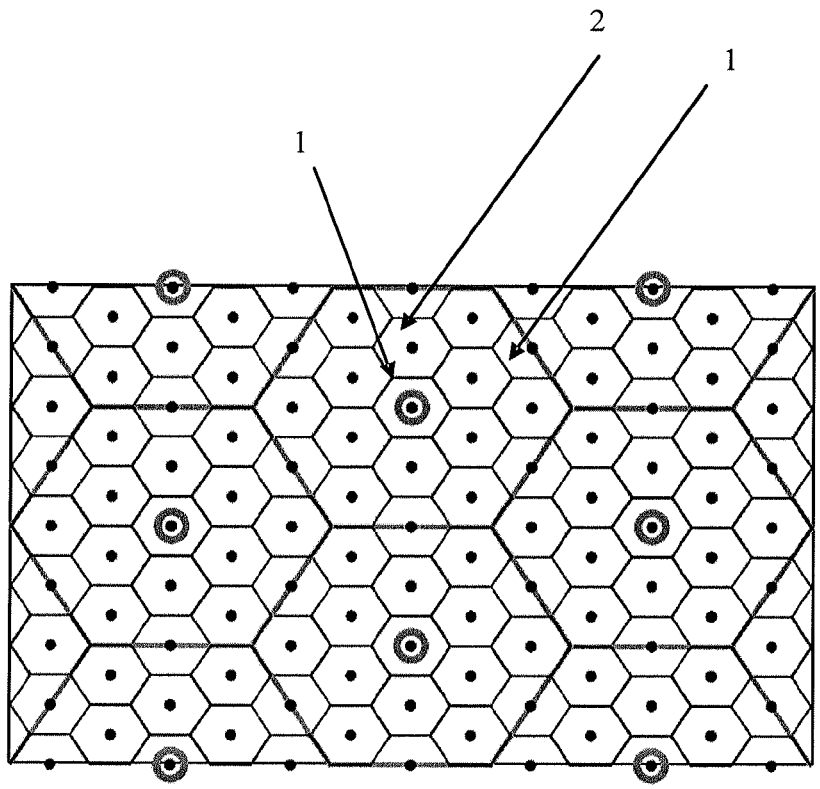
FIG. 2 is a diagram of a lattice structure according to an embodiment of the present invention.

FIG. 2 is a diagram of a lattice structure according to an embodiment of the present invention. To facilitate the description, a T-dimensional nest-shaped lattice diagram shown in FIG. 2 is considered first. The nest-shaped lattice may be expressed as $\Lambda$, and is formed by a series of real number points. By using a real number domain lattice generating matrix L (T×T), the lattice is generated as: $\Lambda=\{x=LW, W \in Z^H\}$, where $Z^H$ is a positive integer.

A lattice quantization function $Q_\Lambda:R^H \to \Lambda$ projects any point x to a lattice point $\lambda$ with a minimum Euclidean distance from the point, which may be expressed as:

$$Q_\Lambda(x) = \underset{\lambda \in \Lambda}{\mathrm{argmin}} \|x - \lambda\| \quad (1)$$

Therefore, a corresponding quantization error is:

$$x \, \mathrm{Mod}(\Lambda) = x - Q_\Lambda(x) \quad (2)$$

If a nest-shaped lattice code L1 is further defined, after x is projected to a coarse lattice $\Lambda$, the coarse lattice is further latticed inside to become a fine lattice $\Lambda 1$ formed by projected points. As shown in FIG. 2, a black point 1 is a fine lattice point $\Lambda 1$, and a grey circle 2 is a coarse lattice point $\Lambda$. In this way, $\Lambda 1$ is known as a nest of $\Lambda 1$. Obviously, $\Lambda \subseteq \Lambda 1$. In such a structure, a rate may be expressed as:

$$R = \frac{1}{T}\log(|L_1|) = \frac{1}{T}\log\frac{Vol(V)}{Vol(V_1)} \quad (3)$$

Vol(V) herein is the volume of a range of a lattice that corresponds to $\Lambda$, and $Vol(V_1)$ is the volume that corresponds to $\Lambda 1$.

All to-be-sent data streams of the $k^{th}$ transmitting device are modulated through a modulation manner such as quadrature phase shift keying (Quadrature Phase Shift Keying, hereinafter referred to as QPSK) or quadrature amplitude modulation (Quadrature amplitude modulation, hereinafter referred to as QAM) that includes 16 symbols, and mapped to the nest-shaped lattice $\Lambda$. By taking an $l^{th}$ to-be-sent data stream of the $k^{th}$ transmitting device as an example, the $l^{th}$ to-be-sent data stream is a lattice point data stream that is obtained by modulating and mapping the $l^{th}$ to-be-sent data stream to a lattice point in a nest-shaped lattice $\Lambda$ grid, and may be expressed as $\{t_k^l, \tilde{t}_k^l\}$. In this way, the $l^{th}$ to-be-sent data stream $x_k^l$ of the $k^{th}$ transmitting device may be expressed as:

$$x_k^l = t_k^l \bmod \Lambda + j\tilde{t}_k^l \bmod \Lambda \quad (4)$$

Afterward, precoding processing is performed on the $l^{th}$ to-be-sent data stream $x_k^l$ by using a precoding parameter $v_k^l$.

Step 101: Send a precoded $l^{th}$ to-be-sent data stream to a $k^{th}$ receiving device.

The $k^{th}$ transmitting device sends the precoded $l^{th}$ to-be-sent data stream to a corresponding $k^{th}$ receiving device, so that the $k^{th}$ receiving device filters out interference according to these parameters, and obtains an $l^{th}$ data stream.

With the data stream processing method in this embodiment, after precoding processing is performed on a data stream that is modulated onto a lattice, the data stream is sent to a receiving device, so that the data stream receiving device can perform interference alignment processing to solve an interfering data stream and obtain a target data stream. The technical solution provided in this embodiment of the present invention is helpful for filtering out interference at a receiving device side, exactly complies with an actual processing procedure of an interfering data stream, and has strong practicability.

It should be noted that data on the lattice point may be disturbed by various kinds of interference, and for a data stream that corresponds to each lattice point, a disturbance exists. By taking the $l^{th}$ to-be-sent data stream $\{t_k^l, \tilde{t}_k^l\}$ of the $k^{th}$ transmitting device as an example, correspondingly, a disturbing data stream that disturbs the $l^{th}$ to-be-sent data stream mapped onto the lattice point may be expressed as $\{d_k^l, \tilde{d}_k^l\}$. Disturbance parameters $d_k^l$ and $\tilde{d}_k^l$ that correspond to each data stream of each transmitting device are known to both a transmitting device and a corresponding receiving device. In this way, the $l^{th}$ to-be-sent data stream of the $k^{th}$ transmitting device may be expressed as:

$$X_k^l = [t_k^l - d_k^l] \bmod \Lambda + j[\tilde{t}_k^l - \tilde{d}_k^l] \bmod \Lambda$$

When a disturbance parameter is 0, the $l^{th}$ to-be-sent data stream includes only a lattice point data stream that is modulated onto a lattice point.

In an MIMO channel system, after all transmitting devices perform the processing described in the foregoing embodiment on all to-be-sent data streams, at the receiving device side, an approximate aggregate lattice I of all interference received by the receiving device may be expressed as:

$$I = \sum_{i,n} a_i^n x_i^n 1_{\{i \neq k \& n \neq l\}}$$

$a_i^n$ represents an interference alignment quantization parameter that corresponds to an $n^{th}$ data stream of an $i^{th}$ transmitting device, and $a_i^n \in Z+jZ$; Z is a positive integer, and both its real part and its imaginary part are integers; and $x_i^n$ represents the $n^{th}$ data stream of the $i^{th}$ transmitting device; and $1_{\{i \neq k \& n \neq l\}}$ represents that the value is 1 when $i \neq k$ & $n \neq l$, or else, the value is 0. $i=1, 2, \ldots K$, and K is the number of transmitting devices; $n=1, 2, \ldots N_i$, and $N_i$ is the number of data streams included in the $i^{th}$ transmitting device.

Correspondingly, at the receiving device side, an interference alignment residual error corresponding to a data stream received from the transmitting device may be expressed as:

$$I_e = p \sum_{i,n} |(u)^H \hat{H}_{ki} v_i^n - a_i^n|^2 1_{\{i \neq k \& n \neq l\}}$$

$I_e$ represents an interference alignment residual error. P is power of each data stream; a precoding parameter is $v_i^n$; $a_i^n$ represents the interference alignment quantization parameter that corresponds to the $n^{th}$ data stream of the $i^{th}$ transmitting device; and $\hat{H}_{ki}$ represents a channel coefficient from the $i^{th}$ transmitting device to the $k^{th}$ receiving device.

In the foregoing embodiment, precoding of the data stream and sending of the precoded data stream to the receiving device are both performed in the case that the precoding parameter and channel information between the receiving device and the transmitting device are assumed to be known, which can ensure that interference alignment is performed at the receiving device side to filter out interference.

To filter out interference effectively, parameter optimization processing may be performed at the receiving device side, so that a corresponding interference alignment residual error is minimized and interference is filtered out.

Figure 3:
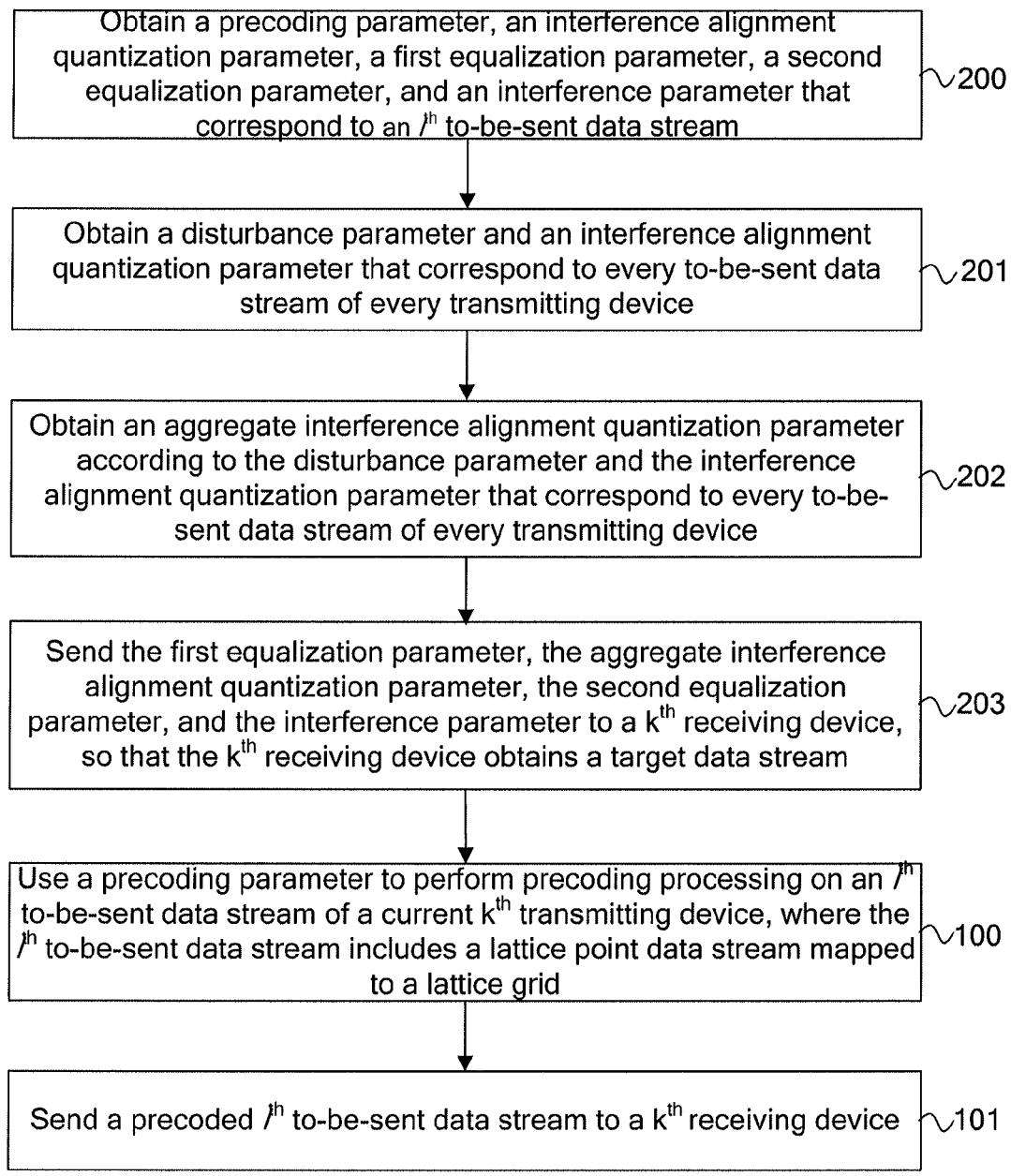
FIG. 3 is a flow chart of a data stream processing method according to Embodiment 2 of the present invention.

FIG. 3 is a flow chart of a data stream processing method according to Embodiment 2 of the present invention. As shown in FIG. 2, before step 100 of Embodiment 1, the method may further include the following steps:

Step 200: Obtain a precoding parameter $v_k^l$, an interference alignment quantization parameter $a_k^l$, a first equalization parameter $u_k^l$, a second equalization parameter $\tilde{u}_k^l$, and an interference parameter $c_k^l$ that correspond to an $l^{th}$ to-be-sent data stream.

Step 201: Obtain a disturbance parameter $\{d_i^n, \tilde{d}_i^n\}$ and an interference alignment quantization parameter $a_i^n$ that correspond to every to-be-sent data stream of every transmitting device, where $i=1, 2, \ldots K$, K represents the number of transmitting devices, $n=1, 2, \ldots N_i$, and $N_i$ represents the number of to-be-sent data streams corresponding to a $k^{th}$ transmitting device.

Step 202: Obtain an aggregate interference alignment quantization parameter B according to the disturbance parameter $\{d_i^n, \tilde{d}_i^n\}$ and the interference alignment quantization parameter $a_i^n$ that correspond to every to-be-sent data stream of every transmitting device.

Step 203: Send the first equalization parameter $u^l$, the aggregate interference alignment quantization parameter B, the second equalization parameter $\tilde{u}^l$, and the interference parameter $c^l$ to a $k^{th}$ receiving device, so that the $k^{th}$ receiving device obtains a target data stream.

In this embodiment, like Embodiment 1 in the foregoing, the $k^{th}$ transmitting device is still used as an execution entity. Before performing precoding processing on the $l^{th}$ to-be-sent data stream, the $k^{th}$ transmitting device also needs to perform parameter optimization processing and obtain a precoding parameter $v_k^l$, an interference alignment quantization parameter $a_k^l$, a first equalization parameter $u_k^l$, a second equalization parameter $\tilde{u}_k^l$, and an interference parameter $c_k^l$ that correspond to the $l^{th}$ to-be-sent data stream. For universality, in this embodiment, it is assumed that the $l^{th}$ to-be-sent data stream includes a lattice point data stream that is mapped to a lattice grid and a disturbing data stream that disturbs the lattice point data stream by using a disturbance parameter. When there is no disturbance, the disturbance parameter may be 0. Afterward, the disturbance parameter $d_i^n$, $\tilde{d}_i^n$ and the interference alignment quantization parameter $a_i^n$ that correspond to every to-be-sent data stream of every transmitting device are obtained, where $i=1, 2, \ldots K$, K represents the number of transmitting devices, $n=1, 2, \ldots N_i$, and $N_i$ represents the number of data streams included in an $i^{th}$ transmitting device. The number of data streams included in each transmitting device may be the same, and may also be different.

An aggregate interference alignment quantization parameter B is obtained according to the disturbance parameter $d_i^n$, $\tilde{d}_i^n$ and the interference alignment quantization parameter $a_i^n$ that correspond to every to-be-sent data stream of every transmitting device. For example, a formula $$B = \sum_{i,n} (R\{a_i^n\}d_i^n - I\{a_i^n\}\tilde{d}_i^n)$$

may be used to obtain the aggregate interference alignment quantization parameter B through calculation. When the disturbance parameter $d_i^n, \tilde{d}_i^n$ and the interference alignment quantization parameter $a_i^n$ that correspond to every to-be-sent data stream of every transmitting device are definite, the aggregate interference alignment quantization parameter B is a fixed value.

Afterward, the current $k^{th}$ transmitting device sends to a receiving device: the first equalization parameter $u_k^l$, the aggregate interference alignment quantization parameter B, the second equalization parameter $\tilde{u}_k^l$, and the interference parameter $c_k^l$ that are obtained, so that the receiving device performs interference alignment processing on a received data stream according to these parameters, and obtains an $l^{th}$ data stream sent by the $k^{th}$ transmitting device.

In a practical application, all transmitting devices may send, according to the steps in this embodiment, parameters that correspond to each to-be-sent data stream to the receiving device, so that the receiving device performs interference alignment according to these parameters, so as to filter out interference effectively. The aggregate interference alignment quantization parameter B is a global parameter, and is the same for each transmitting device. Each transmitting device may broadcast the aggregate interference alignment quantization parameter B to each receiving device in a broadcasting manner.

In this embodiment, after sending each parameter according to the foregoing steps in this embodiment, the $k^{th}$ transmitting device performs precoding processing on the $l^{th}$ to-be-sent data stream by using an optimized precoding parameter $v_k^l$ according to step 100 in Embodiment 1 described in the foregoing, and then sends the precoded $l^{th}$ to-be-sent data stream to the receiving device, so that the receiving device filters out interference for the received $l^{th}$ data stream according to each received parameter that is sent in the steps described in this embodiment, to obtain a target data stream.

With the data stream processing method in this embodiment, each parameter that corresponds to the $l^{th}$ to-be-sent data stream is obtained through each foregoing step, and each parameter is sent to the receiving device, so that the receiving device filters out interference according to these parameters, and obtains a target data stream in the $l^{th}$ to-be-sent data stream. The technical solution provided in this embodiment of the present invention is helpful for filtering out interference, exactly complies with an actual processing procedure of an interfering data stream, and has strong practicability.

Figure 4:
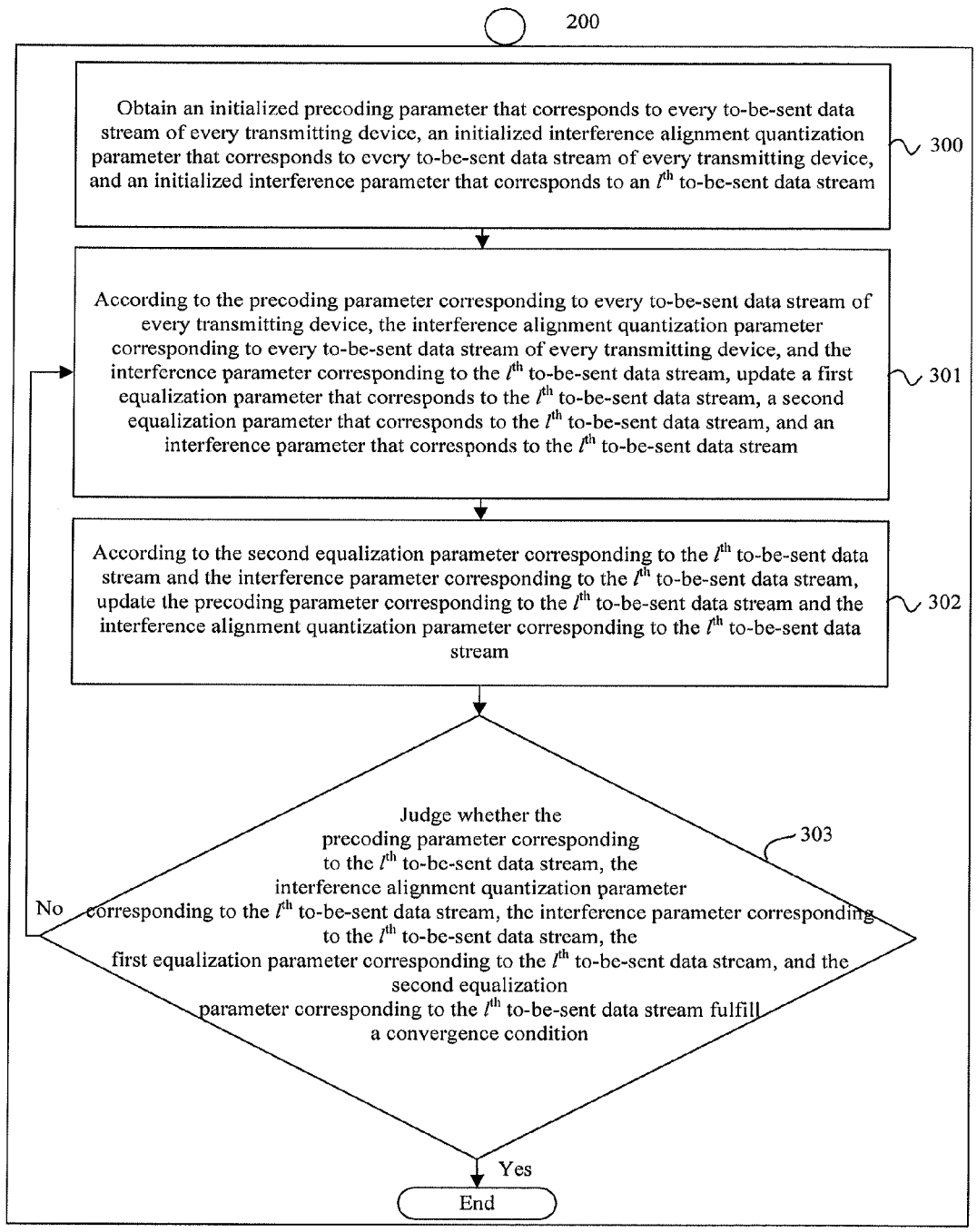
FIG. 4 is a flow chart of a data stream processing method according to Embodiment 3 of the present invention.

FIG. 4 is a flow chart of a data stream processing method according to Embodiment 3 of the present invention. As shown in FIG. 3, on the basis of Embodiment 2 in the foregoing, in a process that a $k^{th}$ transmitting device, according to step 200, performs parameter optimization processing and obtains a precoding parameter $v_k^l$, an interference alignment quantization parameter $a_k^l$, a first equalization parameter $u_k^l$, a second equalization parameter $\tilde{u}_k^l$, and an interference parameter $c_k^l$ that correspond to an $l^{th}$ to-be-sent data stream, all transmitting devices need to be taken into consideration together to optimize the design. Step 200 in FIG. 3 may specifically include the following steps:

Step 300: Obtain an initialized precoding parameter $v_i^n$ that corresponds to every to-be-sent data stream of every transmitting device, an initialized interference alignment quantization parameter that corresponds to every to-be-sent data stream of every transmitting device, and an initialized interference parameter that corresponds to an $l^{th}$ to-be-sent data stream.

Before parameter optimization, it needs to initialize a precoding parameter that corresponds to every to-be-sent data stream of every transmitting device and an interference alignment quantization parameter that corresponds to every to-be-sent data stream of every transmitting device. Obtain the initialized precoding parameter that corresponds to every to-be-sent data stream of every transmitting device and the initialized interference alignment quantization parameter that corresponds to every to-be-sent data stream of every transmitting device, and at the same time, obtain the initialized interference parameter that corresponds to the $l^{th}$ to-be-sent data stream.

Step 301: According to the precoding parameter corresponding to every to-be-sent data stream of every transmitting device, the interference alignment quantization parameter corresponding to every to-be-sent data stream of every transmitting device, and the interference parameter corresponding to the $l^{th}$ to-be-sent data stream, update a first equalization parameter that corresponds to the $l^{th}$ to-be-sent data stream, a second equalization parameter that corresponds to the $l^{th}$ to-be-sent data stream, and an interference parameter that corresponds to the $l^{th}$ to-be-sent data stream.

Specifically, step 301 may include the following:

(1) According to the precoding parameter $v_i^n$ corresponding to every to-be-sent data stream of every transmitting device, and the interference alignment quantization parameter $a_i^n$ corresponding to every to-be-sent data stream of every transmitting device, update the first equalization parameter $u_k^l$ that corresponds to the $l^{th}$ to-be-sent data stream, where $i=1, 2, \ldots K$, K is the number of transmitting devices, $n=1, 2, \ldots N_i$, and $N_i$ is the number of data streams included in an $i^{th}$ transmitting device.

For example, the following formula may be used:

$$(u_k^l) = \underset{u_k^l}{\operatorname{argmin}}\left( \|u_k^l\|^2 + P\sum_{i,n} \left| (u_k^l)^H \hat{H}_{ki} V_i^n - a_i^n \right| + \varepsilon \|V_i^n\| \square \|u_k^l\|^2 \right)$$

to update the first equalization parameter $u_i^l$ that corresponds to the $l^{th}$ to-be-sent data stream.

$u_k^l$ represents the first equalization parameter that corresponds to the $l^{th}$ data stream of the $k^{th}$ transmitting device; P represents power of any one to-be-sent data stream, where it is assumed that all to-be-sent data streams have the same power; $\hat{H}_{ki}$ represents a channel coefficient from the $i^{th}$ transmitting device to a $k^{th}$ receiving device; $\epsilon$ is a neighborhood radius of $\hat{H}_{ki}$, and is a constant; $a_i^n$ represents an interference alignment quantization parameter that corresponds to an $n^{th}$ data stream of the $i^{th}$ transmitting device; $V_i^n$ represents a precoding parameter that corresponds to the $n^{th}$ data stream of the $i^{th}$ transmitting device, where $i=1, 2, \ldots K$, K is the number of transmitting devices, $n=1, 2, \ldots N_i$, and $N_i$ is the number of to-be-sent data streams included in the $i^{th}$ transmitting device. The number of to-be-sent data streams corresponding to each transmitting device may be the same, and may also be different.

(2) According to the precoding parameter $V_i^n$ corresponding to every to-be-sent data stream of every transmitting device, the interference alignment quantization parameter $a_i^n$ corresponding to every to-be-sent data stream of every transmitting device, and the interference parameter $c^l$ corresponding to the $l^{th}$ to-be-sent data stream, update the second equalization parameter $\tilde{u}_k^l$ that corresponds to the $l^{th}$ to-be-sent data stream.

For example, the following formula may be used:

$$\tilde{u}_k^l = \underset{u_k^l}{\operatorname{argmin}}\left(\|\tilde{u}_k^l\|^2 + P\sum_{i,n}\left|(u_k^l)^H \hat{H}_{ki} V_i^n - a_i^n\right| + \varepsilon\|V_i^n\|\Box\|\tilde{u}_k^l\|^2\right)$$

to update the second equalization parameter $\tilde{u}_k^l$ that corresponds to the $l^{th}$ to-be-sent data stream.

$\tilde{u}_k^l$ represents the second equalization parameter that corresponds to the $l^{th}$ data stream of the $k^{th}$ transmitting device.

(3) According to a precoding parameter $V_i^l$ corresponding to the $l^{th}$ to-be-sent data stream, an interference alignment quantization parameter $a_i^l$ corresponding to the $l^{th}$ to-be-sent data stream, and the second equalization parameter $\tilde{u}_k^l$ corresponding to the $l^{th}$ to-be-sent data stream, update the interference parameter $C_k^l$ corresponding to the $l^{th}$ to-be-sent data stream.

For example, the following formula may be used:

$$C_k^l = \arg\min_{R\{C_k^l\}\in[R\{\tau\},R\{k\}], I\{C_k^l\}\in[I\{\tau\},I\{k\}]} f(C_k^l)$$

to update the interference parameter that corresponds to the $l^{th}$ to-be-sent data stream.

A first variable is $\tau=\tilde{C}_k^l-(1+j)$, and a second variable is $k=\tilde{C}_k^l+(1+j)$.

$\tilde{C}_k^l$ is a result of widening $C_k^l$ from a complex integer domain $C_k^l=Z+jZ$ to a complex domain $\tilde{C}_k^l \in C$, where Z is a positive integer and C is a complex number.

An intermediate function is $$f(C_k^l) = \sum_{i,n}\|(\tilde{u}_k^l)^H \hat{H}_{ki} V_i^n - C_k^l a_i^n - 1_{\{i=k\&n=l\}}\| + \varepsilon\|V_i^n\|\Box\|\tilde{u}_k^l\|^2),$$

where $C_k^l$ represents the interference parameter that corresponds to the $l^{th}$ data stream of the $k^{th}$ transmitting device.

(4) Judge whether a convergence condition is fulfilled between the second equalization parameter $\tilde{u}_k^l$ corresponding to the $l^{th}$ to-be-sent data stream and the interference parameter $c_k^l$ corresponding to the $l^{th}$ to-be-sent data stream. If fulfilled, end the procedure; otherwise, return to step (2) to continue execution.

For example, judging whether the convergence condition is fulfilled between the second equalization parameter $\tilde{u}_k^l$ corresponding to the $l^{th}$ to-be-sent data stream and the interference parameter $c_k^l$ corresponding to the $l^{th}$ to-be-sent data stream may be: It may be determined that the convergence condition is fulfilled between the second equalization parameter $\tilde{u}_k^l$ corresponding to the $l^{th}$ to-be-sent data stream and the interference parameter $c_k^l$ corresponding to the $l^{th}$ to-be-sent data stream when a difference between the second equalization parameter $\tilde{u}_k^l$ corresponding to the $l^{th}$ to-be-sent data stream and a second maximum data transmission rate $\mu_k^l$ corresponding to the interference parameter $c_k^l$ corresponding to the $l^{th}$ to-be-sent data stream is less than a preset threshold, where the second equalization parameter $\tilde{u}_k^l$ corresponding to the $l^{th}$ to-be-sent data stream is iterated for two consecutive times.

The second maximum data transmission rate $\mu_k^l$ may be expressed as:

$$\tilde{\mu}_k^l = \log\left(\frac{P}{\|\tilde{u}_k^l\|^2 + p\sum_{i,n}\left|\frac{\left|(\tilde{u}_k^l)^H \hat{H}_{kl} V_i^n - C_k^l a_i^n - 1_{\{i=k\&j=l\}}\right| +}{\varepsilon\|V_i^n\|\cdot\|\tilde{u}_k^l\|}\right|^2}\right)$$

Step 302: According to the second equalization parameter corresponding to the $l^{th}$ to-be-sent data stream and the interference parameter corresponding to the $l^{th}$ to-be-sent data stream, update the precoding parameter corresponding to the $l^{th}$ to-be-sent data stream and the interference alignment quantization parameter corresponding to the $l^{th}$ to-be-sent data stream.

Parameter optimization aims to optimize a maximum transmission data rate. For example, functions $$\mu_k^l = \log\frac{P}{g_k^l(V_k^l, a_k^l)} \text{ and } \tilde{\mu}_k^l = \log\frac{P}{\tilde{g}_k^l(V_k^l, a_k^l)}$$

are used to calculate the precoding parameter $V_k^l$ and the interference alignment quantization parameter $a_k^l$ that correspond to the $l^{th}$ to-be-sent data stream and correspond to a first maximum transmission data rate $\mu_k^l$ and the second maximum transmission data rate $\tilde{\mu}_k^l$, which is equivalent to obtaining the precoding parameter $V_k^l$ corresponding to the $l^{th}$ to-be-sent data stream and the interference alignment quantization parameter $a_k^l$ corresponding to the $l^{th}$ to-be-sent data stream corresponding to minimum values of the functions $g_k^l(V, a_k^l)$ and $\tilde{g}_k^l(V, a_k^l)$. By using the foregoing method, the precoding parameter $V_k^l$ corresponding to the $l^{th}$ to-be-sent data stream, and the interference alignment quantization parameter $a_k^l$ corresponding to the $l^{th}$ to-be-sent data stream may be updated.

$g_k^l(V, a_k^l)$ represents a first residual interference and noise function.

Specifically, $$g_k^l(V, a_k^l) = \|u_k^l\|^2 + P\sum_{i,n}\left|(u_k^l)^H \hat{H}_{ki} V_i^n - a_i^n\right| + \varepsilon\|V_i^n\|\Box\|u_k^l\|^2.$$

$\tilde{g}_k^l(V, a_k^l)$ represents a second residual interference and noise function.

Specifically, $$\tilde{g}_k^l(V, a_k^l) =$$
$$\|\tilde{u}_k^l\|^2 + P\sum_{i,n}\left|(\tilde{u}_k^l)^H \hat{H}_{ki} V_i^n - C_k^l a_i^n - 1_{\{i=k\&n=1\}}\right| + \varepsilon\|V_i^n\|\Box\|\tilde{u}_k^l\|^2.$$

$\mu_k^l$ represents the first maximum transmission data rate corresponding to the $l^{th}$ data stream of the $k^{th}$ transmitting device, and $\tilde{\mu}_k^l$ represents a second maximum transmission data rate corresponding to the $l^{th}$ data stream of the $k^{th}$ transmitting device.

Step 303: Judge whether the precoding parameter corresponding to the $l^{th}$ to-be-sent data stream, the interference alignment quantization parameter corresponding to the $l^{th}$ to-be-sent data stream, the interference parameter corresponding to the $l^{th}$ to-be-sent data stream, the first equalization parameter corresponding to the $l^{th}$ to-be-sent data stream, and the second equalization parameter corresponding to the $l^{th}$ to-be-sent data stream fulfill a convergence condition. If not fulfilled, return to step 301; and if fulfilled, end the procedure.

After the $i^{th}$ transmitting device has performed the foregoing step, the first equalization parameter $u_k^l$, the second equalization parameter $\tilde{u}_k^l$, the precoding parameter $v_k^l$, the interference parameter $c_k^l$, and the interference alignment quantization parameter $a_k^l$ may be obtained, which correspond to sending of the $l^{th}$ to-be-sent data stream of the $k^{th}$ transmitting device to the $k^{th}$ receiving device. For any other transmitting device, by using the foregoing step, all parameters corresponding to each to-be-sent data stream of each transmitting device may also be obtained.

Afterward, relevant steps in Embodiment 2 and Embodiment 1 in the foregoing are performed to finish processing the $l^{th}$ to-be-sent data stream.

The parameter optimization in Embodiment 3 and Embodiment 2 is performed in the case that channel state information between the transmitting device and the receiving device is determined. In the subsequent embodiments, why the optimization is performed in such a manner is specifically described. With the data stream processing method in this embodiment, each parameter corresponding to the $l^{th}$ to-be-sent data stream of the transmitting device is optimized through each foregoing step, and each parameter is sent to the receiving device, so that the receiving device filters out interference according to these parameters, and obtains a target data stream in the $l^{th}$ to-be-sent data stream. The technical solution in this embodiment of the present invention is helpful for filtering out interference, exactly complies with an actual processing procedure of an interfering data stream, and has strong practicability.

Figure 5:
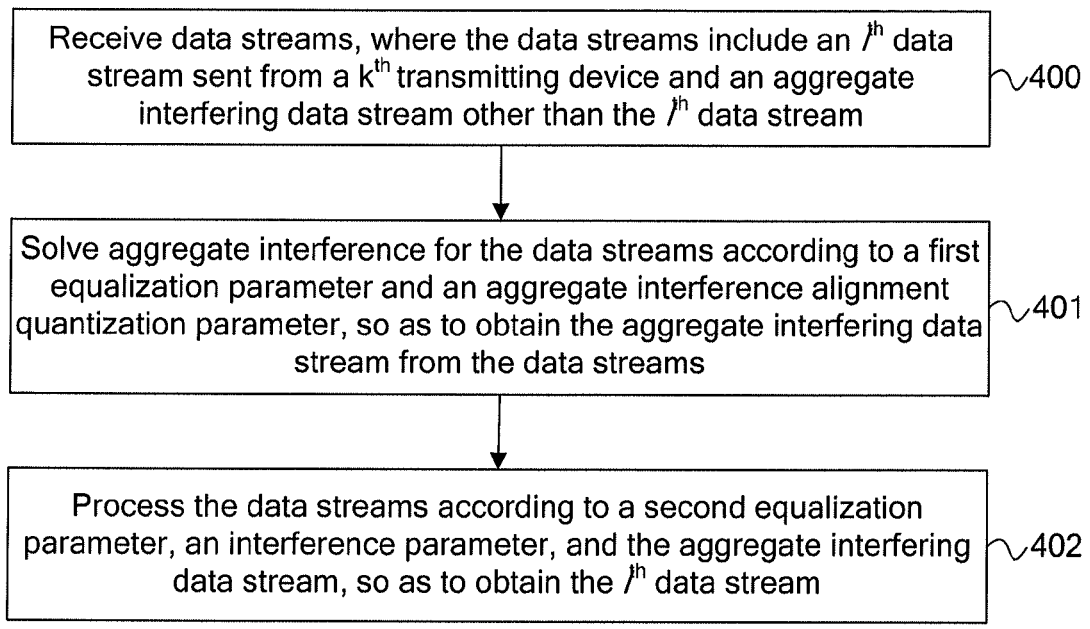
FIG. 5 is a flow chart of a data stream processing method according to Embodiment 4 of the present invention.

FIG. 5 is a flow chart of a data stream processing method according to Embodiment 4 of the present invention. An entity for executing the data stream processing method in this embodiment is a data stream receiving device, which is referred to as a receiving device. As shown in FIG. 5, the data stream processing method in this embodiment may include the following steps:

Step 400: Receive data streams, where the data streams include an $l^{th}$ data stream sent from a $k^{th}$ transmitting device and an aggregate interfering data stream other than the $l^{th}$ data stream.

The data stream processing method in this embodiment corresponds to the data stream processing method in the embodiment shown in FIG. 1. The data stream processing method shown in FIG. 1 is executed at a transmitting device side. The data stream processing method in this embodiment is executed at a receiving device side. In this embodiment, that an execution entity is a $k^{th}$ receiving device is taken as an example. Correspondingly, the $k^{th}$ receiving device receives data streams sent by the $k^{th}$ transmitting device.

First, the $k^{th}$ receiving device receives data streams, where the data streams include an $l^{th}$ data stream sent by the $k^{th}$ transmitting device. Corresponding to Embodiment 1 in the foregoing, that a target data stream is the $l^{th}$ data stream is taken as an example. The data streams further include an aggregate interfering data stream other than the $l^{th}$ data stream, namely, a set of all interfering data streams. The aggregate interfering data stream herein includes an interfering data stream from another transmitting device, and an interfering data stream that comes from the $k^{th}$ transmitting device and is other than the $l^{th}$ data stream.

Step 401: Solve aggregate interference for the data streams according to a first equalization parameter and an aggregate interference alignment quantization parameter, so as to obtain the aggregate interfering data stream from the data streams.

The $k^{th}$ receiving device performs, according to the first equalization parameter and the aggregate interference alignment quantization parameter, aggregate interference processing on the data streams received in step 400, so as to obtain the aggregate interfering data stream from the received data streams.

The first equalization parameter and the aggregate interference alignment quantization parameter are sent by an $i^{th}$ transmitting device beforehand. The first equalization parameter and the aggregate interference alignment quantization parameter are obtained through optimization performed by the $i^{th}$ transmitting device together with all other transmitting devices according to channel state information between a receiving device and a transmitting device.

Step 402: Process the data streams according to a second equalization parameter, an interference parameter, and the aggregate interfering data stream, so as to obtain the $l^{th}$ data stream.

According to the data streams received in step 400 and the aggregate interfering data stream obtained in step 401, an initial target data stream may be obtained by subtracting the aggregate interfering data stream from the data streams. Afterward, decoding processing is performed on the initial target data stream according to the second equalization parameter and the interference parameter to obtain a target data stream, namely, the $l^{th}$ data stream sent by the $k^{th}$ transmitting device. When the target data stream includes a disturbance, obtain a lattice data stream in the target data stream according to a disturbance parameter.

The second equalization parameter and the interference parameter herein are sent by the $k^{th}$ transmitting device beforehand, and are also obtained through optimization performed by the $k^{th}$ transmitting device together with all other transmitting devices according to the channel state information between the receiving device and the transmitting device.

With the data stream processing method in this embodiment, aggregate interference is solved for the received data streams, and each parameter corresponding to the $l^{th}$ to-be-sent data stream of the transmitting device is optimized through each foregoing step, and each parameter is sent to the receiving device, so that the receiving device filters out interference according to these parameters, and obtains a target data stream in the $l^{th}$ to-be-sent data stream. The technical solution in this embodiment of the present invention is helpful for filtering out interference, exactly complies with an actual processing procedure of an interfering data stream, and has strong practicability.

It should be noted that, corresponding to the $k^{th}$ transmitting device, the $l^{th}$ data stream herein may include a lattice point data stream mapped to a lattice grid; or include a lattice point data stream mapped to a lattice grid and a disturbing data stream that disturbs the lattice point data stream by using a disturbance parameter. For universality, it may be assumed that the $l^{th}$ data stream includes a lattice point data stream mapped to a lattice grid and a disturbing data stream that disturbs the lattice point data stream by using a disturbance parameter. When the disturbance parameter is 0, the $l^{th}$ data stream includes only the lattice point data stream mapped to the lattice grid. When a disturbance exists, the disturbance parameter is known to both two ends of the transmitting device and the receiving device. When the $l^{th}$ data stream is obtained in step 402, a corresponding lattice point data stream may be obtained according to the disturbance parameter. When the disturbance parameter is 0, no disturbance exists. In this case, the obtained target data stream is the lattice point data stream.

Before step 400 in the foregoing embodiment, the method further includes: receiving a first equalization parameter, an aggregate interference alignment quantization parameter, a second equalization parameter, and an interference parameter that are sent by the $k^{th}$ transmitting device.

Specifically, when the $k^{th}$ receiving device receives the data streams, such as the $l^{th}$ data stream, sent by the $k^{th}$ transmitting device, the received data streams include other interfering data streams that are from other transmitting devices, are sent by the $k^{th}$ transmitting device, and are other than the $l^{th}$ data stream. Therefore, before receiving the data streams, such as the $l^{th}$ data stream, sent by the $k^{th}$ transmitting device, the $k^{th}$ receiving device receives the first equalization parameter, the aggregate interference alignment quantization parameter, the second equalization parameter, and the interference parameter, so as to obtain the $l^{th}$ data stream sent by the $k^{th}$ transmitting device from the received data streams according to the steps described in Embodiment 4 in the foregoing.

The technical solution in the foregoing embodiment is described in detail in the following by using an example.

It is assumed that a signal received by the $k^{th}$ receiving device is expressed as:

$$Y_k = \sum_l H_{kk} V_k^l x_k^l + \sum_{i \neq k} \sum_l H_{ki} V_i^l x_i^l + Z_k \quad (5)$$

$Y_k$ represents a data stream received by the $k^{th}$ receiving device; $H_{kk}$ is a channel coefficient from the $k^{th}$ transmitting device to the $k^{th}$ receiving device; $V_k^l$ represents a precoding parameter corresponding to the $l^{th}$ data stream that is received by the $k^{th}$ receiving device from the $k^{th}$ transmitting device; $x_k^l$ represents the $l^{th}$ data stream received by the $k^{th}$ receiving device from the $k^{th}$ transmitting device; and $Z_k$ is white Gaussian noise. In the formula, a first term $$\sum_l H_{kk} V_k^l x_k^l$$

represents a target data stream, and a second term and a third term represent noise.

(i) Solving the Aggregate Interfering Data Stream

At the $k^{th}$ receiving device side, the first equalization parameter $u_k^l$ is used to perform equalization processing on the received data stream $Y_k$, which is specifically as follows:

$$y_k^l = (u_k^l)^H Y_k = \quad (6)$$
$$(u_k^l)^H H_{kk} V_k^l x_k^l + \sum_{n \neq l} (u_k^l)^H H_{kk} V_k^n x_k^n + \sum_{n \neq k, j} (u_k^l)^H H_{ki} V_i^n x_i^n + (u_k^l)^H Z_k$$

$y_k^l$ represents a signal that undergoes equalization processing performed by using the first equalization parameter $u_k^l$;

and a first term on the right side is inter-stream interference caused by the data streams that are other than the $l^{th}$ data stream and are sent by the $k^{th}$ transmitting device, and a third term is interference caused by other transmitting devices other than the $k^{th}$ transmitting device. A fourth term represents white Gaussian noise interference.

In this way, according to the nest-shaped lattice Λ defined in FIG. 2, at the $k^{th}$ receiving device side, an approximate structured aggregate interfering data stream $I_k^l$ that are be obtained according to the formula (3) may be expressed as:

$$I_k^l = \left[\sum_{i,n} R\{a_i^n x_i^n\}\right] \mod \Lambda + j\left[\sum_{i,n} I\{a_i^n x_i^n\}\right] \mod \Lambda \quad (7)$$

$P_k$ represents the $l^{th}$ data stream received by the $k^{th}$ receiving device from the $k^{th}$ transmitting device. $a_i^n \in Z+jZ$, where Z is a positive integer. $a_k^l = 0$, where R{ } and I{ } represent a real part and an imaginary part respectively.

Because [x+y] mod Λ=[(x mod Λ)+y] mod Λ, with reference to the foregoing formula (7), a real part $R\{I_k^l\}$ and an imaginary part $I\{I_k^l\}$ of the approximate structured aggregate interfering data stream $I_k^l$ may be respectively expressed as:

$$R\{I_k^l\} = \left[\sum_{i,n} R\{a_i^n x_i^n\}\right] \mod \Lambda \quad (8)$$
$$= \left[\left(\sum_{i,n} R\{a_i^n\} t_i^n - I\{a_i^n\} \tilde{t}_i^n\right)\right] \mod \Lambda -$$
$$\left[\left(\sum_{i,n} R\{a_i^n\} d_i^n - I\{a_i^n\} \tilde{d}_i^n\right)\right] \mod \Lambda$$

$$I\{I_k^l\} = \left[\sum_{i,n} I\{a_i^n x_i^n\}\right] \mod \Lambda \quad (9)$$
$$= \left[\left(\sum_{i,n} I\{a_i^n\} t_i^n + R\{a_i^n\} \tilde{t}_i^n\right)\right] \mod \Lambda -$$
$$\left[\left(\sum_{i,n} I\{a_i^n\} d_i^n + R\{a_i^n\} \tilde{d}_i^n\right)\right] \mod \Lambda$$

Referring to the formula (8), to obtain the real part $R\{I_k^l\}$ of the approximate structured aggregate interfering data stream $I_k^l$ is also equivalent to obtain a variable $T_k^l(R)$:

$$T_k^l(R) = [\Sigma_{i,n}(R\{a_i^n\} t_i^n - I\{a_i^n\} \tilde{t}_i^n)] \mod \Lambda \quad (10)$$

In the foregoing formula (10), an estimate value $\hat{T}_k^l(R)$ of $T_k^l(R)$ may be expressed as:

$$\hat{T}_k^l(R) = \left[Q_{\Lambda_m}\left(R\{y_k^l\} + \sum_{i,n}(R\{a_i^n\} d_i^n - I\{a_i^n\} \tilde{d}_i^n)\right)\right] \mod \Lambda \quad (11)$$

$\{d_k^l, \tilde{d}_k^l\}$ of all data streams is known, and is preset between the transmitting device and the receiving device. Moreover, the aggregate interference alignment quantization parameter $$B = \sum_{i,n}\left(R\{a_i^n\} d_i^n - I\{a_i^n\} \tilde{d}_i^n\right)$$

is a fixed value, and is received from the transmitting device beforehand.

Therefore, a value of the real part $R\{I_k^l\}$ of the approximate structured aggregate interfering data stream $I_k^l$ may further be expressed as:

$$R\{I_k^l\} = [\hat{T}_k^l(R) - B] \bmod \Lambda = [[Q_{\Lambda_m}(R\{y_k^l\} + B)] \bmod \Lambda - B] \bmod \Lambda \quad (12)$$

Similarly, referring to the formula (9), to obtain the imaginary part $I\{I_k^l\}$ of the approximate structured aggregate interfering data stream $I_k^l$ is also equivalent to obtain a variable $T_k^l(I)$:

$$T_k^l(I) = [\Sigma_{i,n}(I\{a_i^n\}t_i^n - R\{a_i^n\}\tilde{t}_i^n)] \bmod \Lambda \quad (13)$$

In the foregoing formula (10), an estimate value $\hat{T}_k^l(I)$ of $T_k^l(I)$ may be expressed as:

$$\hat{T}_k^l(I) = \left[Q_{\Lambda_m}\left(I\{y_k^l\} + \sum_{i,n}(I\{a_i^n\}d_i^n + R\{a_i^n\}\tilde{d}_i^n)\right)\right] \bmod \Lambda \quad (14)$$

Similarly, $\{d_k^l, \tilde{d}_k^l\}$ of all data streams is known, and is preset between the transmitting device and the receiving device. Moreover, the aggregate interference alignment quantization parameter $$B' = \sum_{i,n}(I\{a_i^n\}d_i^n + R\{a_i^n\}\tilde{d}_i^n)$$

is a fixed value, and is received from the transmitting device beforehand.

Therefore, a value of the imaginary part $I\{I_k^l\}$ of the approximate structured aggregate interfering data stream $I_k^l$ may further be expressed as:

$$I\{I_k^l\} = [\hat{T}_k^l(R) - B'] \bmod \Lambda = [[Q_{\Lambda_m}(I\{y_k^l\} + B')] \bmod \Lambda - B'] \bmod \Lambda \quad (15)$$

In conclusion, with reference to the formulas (6), (12), and (15), the approximate structured aggregate interfering data stream $I_k^l$ may be obtained.

Referring to the formula (5), a current transmission data rate of the $l^{th}$ data stream received by the $k^{th}$ receiving device from the $k^{th}$ transmitting device is:

$$R_k^l \leq \begin{cases} \log\left(\dfrac{P}{\|u_k^l\|^2 + p\sum_{i,n}|(u_k^l)^H H_{ki}V_i^n - a_i^n|^2}\right), & \text{if } a_i^n \neq 0 \\ +\infty, & \text{if } a_i^n = 0 \end{cases} \quad (16)$$

According to the foregoing formula (16), if every $a_i^n = 0$, equivalently, no aggregate interference exists at this time, and the part of solving the aggregate interfering data stream may not be required.

If $a_i^n \neq 0$, a first term in a denominator in a log operator in the formula (16) is noise power, and a second term is a residual lattice alignment error, which is not a Gaussian type. Therefore, eliminating the interference through zeroing directly in the case of a finite signal-to-noise ratio (Signal to Noise Ratio, hereinafter referred to as SNR) and non-ideal CSI is a suboptimal choice.

When a CSI error is considered, the following relationship exists:

$$R_k^l \leq \mu_k^l = \log\left(\dfrac{P}{\|u_k^l\|^2 + p\sum_{i,n}\|(u_k^l)^H H_{ki}V_i^n - a_i^n\| + \varepsilon\|V_i^n\| \cdot \|u_k^l\|^2}\right) \quad (17)$$

$\mu_k^l$ represents a first maximum transmission data rate of the $l^{th}$ data stream that is received by the $k^{th}$ receiving device from the $k^{th}$ transmitting device. The data rate may be regarded as a function that is related to the first equalization parameter $u_k^l$, the precoding parameter $V_i^n$ corresponding to every data stream of every transmitting device, and the interference alignment quantization parameter $a_i^n$, where $i=1, 2, \ldots K$, $K$ represents the number of transmitting devices, $n=1, 2, \ldots N_i$, and $N_i$ is the number of to-be-sent data streams included in the $i^{th}$ transmitting device.

(ii) Obtaining the Target Data Stream

After the aggregate interfering data stream is obtained in the foregoing process, the aggregate interfering data stream $I_k^l$ is filtered out from the received data streams according to the formulas (5) and (7). Afterward, decoding processing is performed by using the second equalization parameter $\tilde{u}_k^l$ and the interference parameter $c_k^l$ to obtain the target data stream. Specifically, the target data stream may be obtained by using the following formula:

$$\tilde{y}_k^l = \begin{cases} (\tilde{u}_k^l)^H Y_K - (\tilde{u}_k^l)^H H_{km}V_m^d X_m^d, & \text{if } a_k^l = \delta_m^d \\ [R\{(\tilde{u}_k^l)^H Y_K - c_k^l I_k^l\}] \bmod \Lambda + j[I\{(\tilde{u}_k^l)^H Y_K - c_k^l I_k^l\}] \bmod \Lambda, & \text{otherwise} \end{cases}$$

$$= \begin{cases} \sum_{i,n}((\tilde{u}_k^l)^H H_{ki}V_i^d)x_i^d 1_{[i\neq m \& n \neq d]} + \tilde{u}_k^l Z_k, & \text{if } a_m^d = \delta_m^d \\ [R\{s_k^l\}] \bmod \Lambda + j[I\{s_k^l\}] \bmod \Lambda, & \text{otherwise} \end{cases} \quad (18)$$

$\tilde{u}_k^l$ is the second equalization parameter, and may be specifically implemented through an equalizer; and $C_k^l \in Z + jZ$ is an interference coefficient of the $l^{th}$ data stream of the $k^{th}$ receiving device.

$$s_k^l = \Sigma_{i,n}((\tilde{u}_k^l)^H H_{ki}V_i^n - C_k^l a_i^n)X_i^n + \tilde{u}_k^l Z_k.$$

From the formula (18), it may be known that if $a_m^d = \delta_m^d$, it represents that only one interfering stream exists, that is, $I_k^l = x_m^d$. In this case, interference $x_m^d$ may be zeroed directly. If $a_m^d \neq \delta_m^d$, for an MIMO system, an otherwise circumstance in the formula (18) is used to obtain the target data stream such as the $l^{th}$ data stream. In this case, a corresponding data rate may be expressed as:

$$R_k^l \leq \tilde{\mu}_k^l = \log\left(\frac{(P)}{\|\tilde{u}_k^l\|^2 + p\sum_{i,n}\left|\left|(\tilde{u}_k^l)^H \hat{H}_{ki} V_i^n - C_k^l a_i^n - 1_{\{i=k \& j=l\}}\right| + \right|^2}{\varepsilon\|V_i^n\|\cdot\|\tilde{u}_k^l\|}\right) \quad (19)$$

$\tilde{\mu}_k^l$ represents a second maximum transmission data rate of the $l^{th}$ data stream received by the $k^{th}$ receiving device from the $k^{th}$ transmitting device. The data rate may be regarded as a function that is related to the second equalization parameter $\tilde{u}_k^l$, the interference parameter $C_k^l$, the precoding parameter $V_i^n$, and the interference alignment quantization parameter $a_i^n$, where $i=1, 2, \ldots K$, K represents the number of transmitting devices, $n=1, 2, \ldots N_i$, and $N_i$ is the number of to-be-sent data streams included in the $i^{th}$ transmitting device.

The foregoing process is a data stream obtaining process. With reference to the foregoing transmitting and receiving of a data stream, it may be known in the following that a system throughput needs to be considered at the time of optimizing design of each parameter at the transmitting device side, aiming at maximizing a minimum data stream rate of a worst user. According to the foregoing formulas (17) and (19), an optimization object may be limited to the first equalization parameter $u_k^l$, the second equalization parameter $\tilde{u}_k^l$, the precoding parameter $V_k^l$, the interference alignment quantization parameter $a_k^l$, and the interference parameter $C_k^l$. For example, the optimization may be briefly expressed as the following optimization function:

$$\{(u_k^l)^*, (\tilde{u}_k^l)^*, (V_k^l)^*, (a_k^l)^*, (C_k^l)^*\} = \begin{cases} \arg\max_{u,\tilde{u},V,a,C} \min_{l,k}(\mu_k^l, \tilde{\mu}_k^l) \\ s\cdot t \sum_{l=1}^{L} \|V_l^l\|^2 \leq \gamma, \forall \gamma \\ a_k^l \in (Z+jZ)^{KL}; C_k^l \in Z+jZ \end{cases} \quad (20)$$

$\gamma$ represents maximum total power of a data stream sent by the current $k^{th}$ transmitting device. $(u_k^l)^*$, $(\tilde{u}_k^l)^*$, $(V_k^l)^*$, $(a_k^l)^*$, $(C_k^l)^*$ respectively represent optimal values of the first equalization parameter $u_k^l$, the second equalization parameter $\tilde{u}_k^l$, the precoding parameter $V_k^l$, the interference alignment quantization parameter $a_k^l$, and the interference parameter $C_k^l$ that correspond to the $l^{th}$ data stream of the current $k^{th}$ transmitting device.

In the foregoing formula (20), a complex vector $\{u_k^l, \tilde{u}_k^l, V_k^l\}$ and an integer variable $\{a_k^l, C_k^l\}$ are included. Therefore, an optimization function in the formula (20) is a non-convex function.

Because it is difficult to search out an optimal integer set, a search space may be simplified in various ways. For example, the search space is optimized by using the following formula:

$$(a_k^l)^* \in A = \left\{a_k^l : \frac{a_i^n}{r} \notin Z+jZ, \forall a_i^n \neq 0, \forall r \in (Z+jZ) \& |r| \neq 1\right\} \forall k, l$$

It is assumed that $\{V_k^l, a_k^l\}$ is fixed, and by analyzing the formulas (17) and (19), it may be known from the formula (17) that only the first equalization parameter $u_k^l$ affects first maximum transmit power $\mu_k^l$; and it may be kwon from the formula (17) that when $C_k^l$ is given, only the second equalization parameter $\tilde{u}_k^l$ affects second maximum transmit power $\tilde{\mu}_k^l$. In this way, the optimization function is converted into a convex function as shown in the following formula (21) and formula (22):

$$(u_k^l)^* = \underset{u_k^l}{\arg\min}\left(\|u_k^l\|^2 + P\sum_{i,n}|(u_k^l)^H \hat{H}_{ki} V_i^n - a_i^n| + \varepsilon\|V_i^n\|\cdot\|u_k^l\|^2\right) \quad (21)$$

$$(\tilde{u}_k^l)^* = \quad (22)$$
$$\underset{\tilde{u}_k^l}{\arg\min}\left(\|\tilde{u}_k^l\|^2 + P\sum_{i,n}\left|\frac{(\tilde{u}_k^l)^H \hat{H}_{ki} V_i^n - C_k^l a_i^n -}{1_{\{i=k \& n=l\}}}\right| + \varepsilon\|V_i^n\|\cdot\|\tilde{u}_k^l\|^2\right)$$

$(u_k^l)^*$ is an optimal value of $u_k^l$; and $(\tilde{u}_k^l)^*$ is an optimal value of $\tilde{u}_k^l$.

For ideal CSI, namely, if $\Delta=0$, $\hat{H}=H$, the formulas (21) and (22) have an optimal closed-form solution respectively:

$$(u_k^l)^* = \left(W^H W + \frac{1}{P}I_{N\times N}\right)^{-1} W^H \alpha_k^l \quad (23)$$

$$(\tilde{u}_k^l)^* = \left(W^H W + \frac{1}{P}I_{N\times N}\right)^{-1} W^H \beta_k^l \quad (24)$$

where $W=[H_{k1}V_1^1, \ldots, H_{k1}V_1^L, H_{k2}V_2^1 \ldots H_{kK}V_K^1]^H$ is a KL×N matrix, and both $a_k^l=[a_1^1, \ldots, a_1^l, a_2^1, \ldots, a_K^L]^H$ and $\beta_k^l=[C_k^l a_1^1, \ldots, C_k^l a_1^L, C_k^l a_2^1, \ldots, 1, \ldots, C_k^l a_K^L]^H$ are KL×N vectors. When the CSI is not ideal, no closed-form solution exists. However, because the formulas (21) and (22) are typical convex functions, $(u_k^l)^*$ and $(\tilde{u}k^l)^*$ may be solved through iterations of a gradient method.

After optimal solutions of the first equalization parameter $u_k^l$ and the second equalization parameter $\tilde{u}_k^l$ are obtained through the foregoing method, the interference parameter $C_k^l$ is optimized according to the second equalization parameter $\tilde{u}_k^l$ with reference to the formula (22).

First, $C_k^l \in Z+jZ$ is widened from a complex integer domain to a $\tilde{C}_k^l \in C$ complex domain. $\tilde{C}_k^l$ is solved first, and then a complex point with a shortest Euclidean distance to $\tilde{C}_k^l$ is obtained. That is, $C_k^l$ is obtained, for example, which may be obtained through the following formula:

$$(C_k^l)^* = \underset{R\{C_k^l\}\in[R\{\tau\},R\{\kappa\}], I\{C_k^l\}\in[I\{\tau\},I\{\kappa\}]}{\arg\min} f(C_k^l) \quad (25)$$

A first intermediate variable $\tau$ is $\tau=(\tilde{C}_k^l)^*-(1+j)$, and a second intermediate variable $\kappa$ is $\kappa=(\tilde{C}_k^l)^*+(1+j)$.

$$f(C_k^l) = \sum_{i,n}\left|\|(\tilde{u}_k^l)^H \hat{H}_{ki} V_i^n - C_k^l a_i^n - 1_{\{i=k \& j=l\}}| + \varepsilon\|V_i^n\|^2 \cdot \|\tilde{u}_k^l\|^2\right| \quad (26)$$

Assume $\tilde{C}_k^l \in C$ to be an optimized variable. Therefore, $(\tilde{C}_k^l)^*=\arg\min_{C_k^l \in C} f(\tilde{C}_k^l)$.

For example, a process of optimizing $\{u_k^l, \tilde{u}_k^l, C_k^l\}$ in the case of a given $\{V,a\}$ is described in detail in the following according to the technical solution in steps (1) to (4) in Embodiment 3 shown in FIG. 3.

(a) Initialize the number (m) of iterations to 0, namely, m=0. Initialize the precoding parameter $V_k^l$, the interference alignment quantization parameter $a_k^l$, and the interference parameter $C_k^l(m)$ in the case that m=0.

(b) According to $V_k^l$ and $a_k^l$, obtain an optimal value $u_k^l(m)$ of the first equalization parameter $u_k^l$ by using the formula (21).

(c) According to $V_k^l$, $a_k^l$ and $C_k^l(m)$, obtain an optimal value $\tilde{u}_k^l(m)$ of the second equalization parameter $\tilde{u}_k^l$ by using the formula (22).

(c) Obtain an interference parameter $C_k^l(m+1)$ through the formulas (25) and (26) according to $V_k^l$, $a_k^l$, $u_k^l(m)$, and $\tilde{u}_k^l(m)$.

(d) Judge whether the second equalization parameter $\tilde{u}_k^l$ and the interference parameter $C_k^l$ fulfill a convergence condition. If so, end the procedure; otherwise, update m to m+1, and return to step (b).

Convergence of the second equalization parameter $\tilde{u}_k^l$ and the interference parameter $C_k^l$ may be expressed as:

$$\bar{\mu}_k^l(\tilde{u}_k^l(m+1), C_k^l(m+1)) > \bar{\mu}_k^l(\tilde{u}_k^l(m+1), C_k^l(m)) > \bar{\mu}_k^l(\tilde{u}_k^l(m), C_k^l(m)) \quad (27)$$

Herein an optimal value of the first equalization parameter $u_k^l$ is not required, but only optimal values of the second equalization parameter $\tilde{u}_k^l$ and the interference parameter $C_k^l$ are required.

For each m herein, a corresponding second maximum data transmission rate $\bar{\mu}_k^l$ may be obtained by using the formula (19). For example, for an $(m+1)^{th}$ iteration, $\bar{\mu}_k^l(m+1)$ is calculated according to $C_k^l(m+1)$ and $\tilde{u}_k^l(m+1)$; and similarly, for an $m^{th}$ iteration, $\bar{\mu}_k^l(m)$ is calculated according to $C_k^l(M)$ and $\tilde{u}_k(m)$. If a difference $|\bar{\mu}_k^l(m+1) - \bar{\mu}_k^l(m)|$ between $\bar{\mu}_k^l(m+1)$ and $\bar{\mu}_k^l(m)$ is less than a certain set threshold $\epsilon_0$, namely, $|\bar{\mu}_k^l(m+1) - \bar{\mu}_k^l(m)| < \epsilon_0$, it is considered that a convergence condition is fulfilled between the second equalization parameter $\tilde{u}_k^l$ and the interference parameter $C_k^l$.

In the following, the precoding parameter $V_k^l$ and the interference alignment quantization parameter $a_k^l$ are optimized according to the first equalization parameter $u_k^l$, the second equalization parameter $\tilde{u}_k^l$, and the interference parameter $C_k^l$ that has already been optimized and determined. To simplify the complexity of optimization, restriction of interference alignment quantization is widened from $a_k^l \in (Z+jZ)^{KL}$ to $a_k^l \in C^{KL}$. The following two formulas are defined according to the formulas (17) and (19):

$$g_k^l(v_k^l, a_k^l) = \|u_k^l\|^2 + P\sum_{i,n} \|(u_k^l)^H \hat{H}_{ki} V_i^n - a_i^n\| + \epsilon \|V_i^n\| \cdot \|u_k^l\|^2 \quad (28)$$

$$\tilde{g}_k^l(v_k^l, a_k^l) = \|\tilde{u}_k^l\|^2 + P\sum_{i,n} \|(\tilde{u}_k^l)^H \hat{H}_{ki} V_i^n - C_k^l a_i^n - 1_{\{i=k \& n=l\}}\| + \epsilon \|V_i^n\| \cdot \|\tilde{u}_k^l\|^2 \quad (29)$$

For any $l^{th}$ data stream and $k^{th}$ receiving device, $g_k^l$ and $\tilde{g}_k^l$ are both convex functions that are related to $(v_k^l, a_k^l)$.

An aim is to maximize a minimum transmission data rate. Assume $\mu_k^l$ to be the first maximum transmission data rate, and assume $\bar{\mu}_k^l$ to be the second maximum transmission data rate. The corresponding precoding parameter $V_k^l$ and the interference alignment quantization parameter may be optimized by solving minimum values of the following formulas (30) and (31):

$$\mu_k^l = \log\frac{P}{g_k^l(V_k^l, a_k^l)} \quad (30)$$

$$\bar{\mu}_k^l = \log\frac{P}{\tilde{g}_k^l(V_k^l, a_k^l)} \quad (31)$$

Both $g_k^l$ and $\tilde{g}_k^l$ are convex functions that are related to $(v_k^l, a_k^l)$. In this way, a non-convex optimization function of the formula (20) may be converted into a convex function. Specifically, the precoding parameter $V_k^l$ and the interference alignment quantization parameter $a_k^l$ may be obtained through an interior point method in the prior art.

Figure 6A:
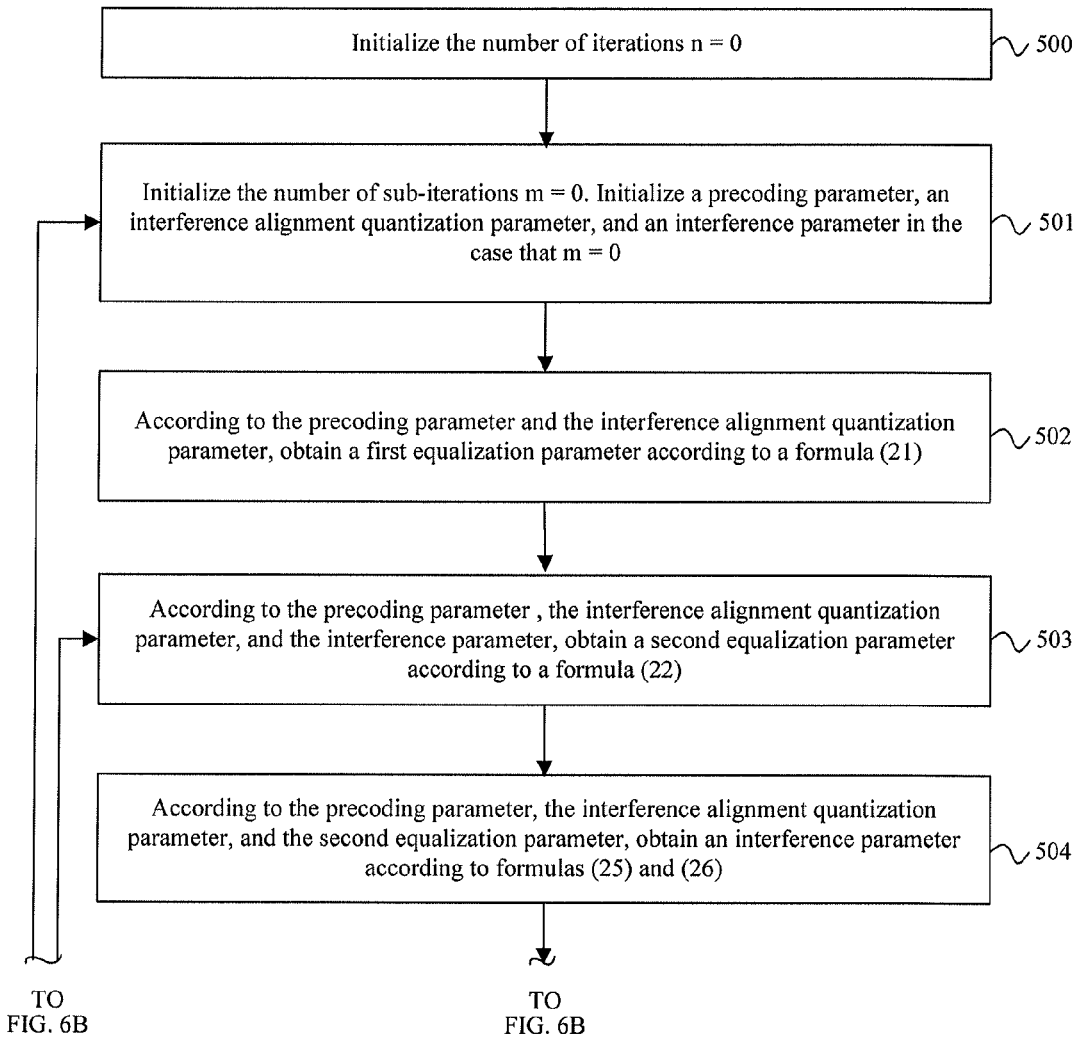
FIGS. 6A and 6B are flow charts of parameter optimization according to an embodiment of the present invention.
Figure 6B:
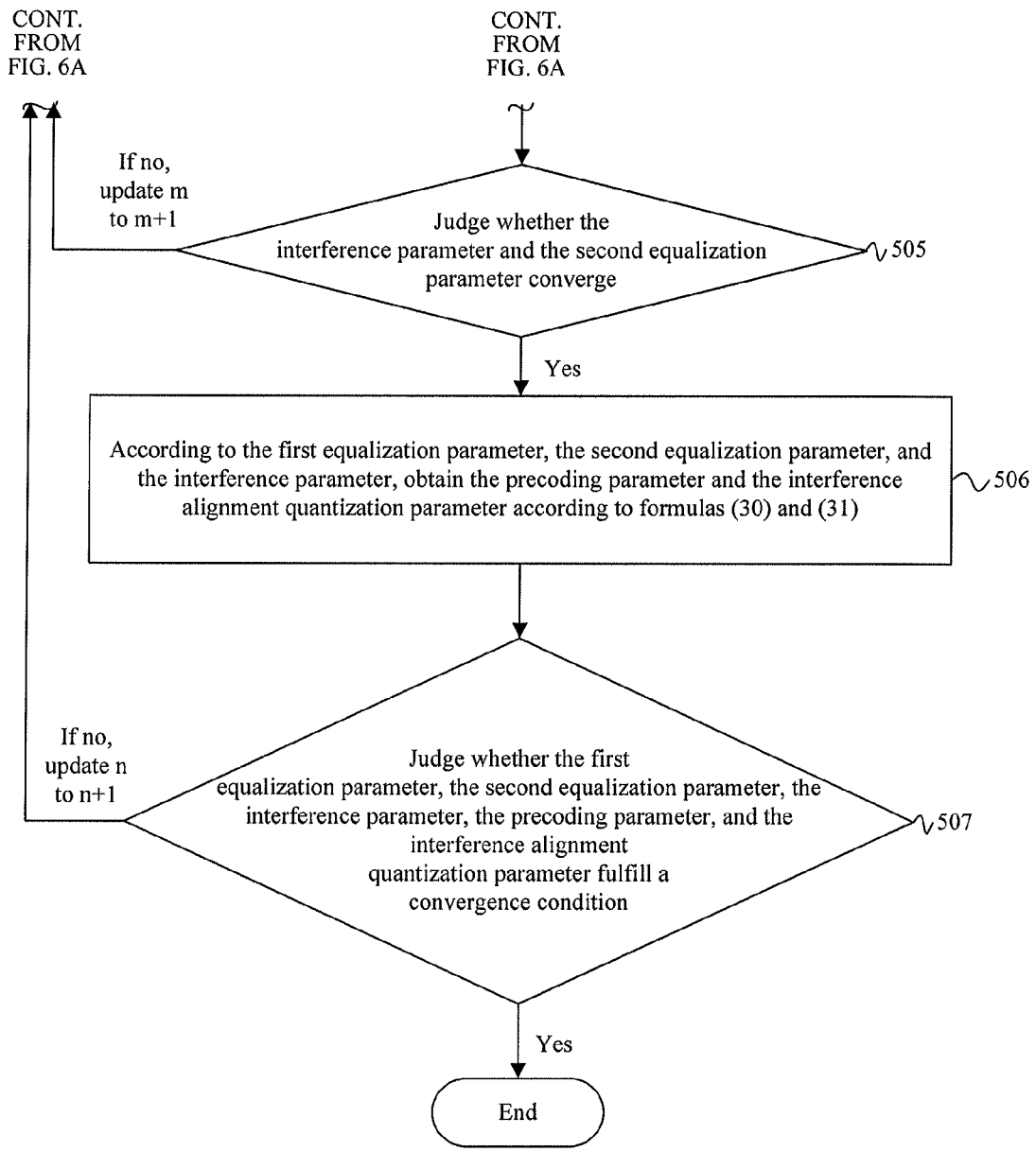

FIG. 6 is a flow chart of parameter optimization according to an embodiment of the present invention. As shown in FIG. 6, a process of parameter optimization processing in this embodiment is described by using the technical solution in Embodiment 3 shown in FIG. 3 as an example, and may specifically include the following steps:

Step 500: Initialize the number of iterations n=0.

Step 501: Initialize the number of sub-iterations m=0. Initialize a precoding parameter $V_k^l(n,m)$, an interference alignment quantization parameter $a_k^l(n,m)$, and an interference parameter $C_k^l(n,m)$ in the case that m=0.

Step 502: According to the precoding parameter $V_k^l(n,m)$ and the interference alignment quantization parameter $a_k^l(n,m)$, obtain a first equalization parameter $u_k^l(n,m)$ according to the formula (21).

Step 503: According to the precoding parameter $V_k^l(n,m)$, the interference alignment quantization parameter $a_k^l(n,m)$, and the interference parameter $C_k^l(n,m)$, obtain a second equalization parameter $\tilde{u}_k^l(n,m)$ according to the formula (22).

Step 504: According to the precoding parameter $V_k^l(n,m)$, the interference alignment quantization parameter $a_k^l(n,m)$, and the second equalization parameter $\tilde{u}_k^l(n,m)$, obtain an interference parameter $C_k^l(n,m+1)$ according to the formulas (25) and (26).

Step 505: Judge whether the interference parameter $C_k^l(n,m+1)$ and the second equalization parameter $\tilde{u}_k^l(n,m)$ converge. If yes, perform step 506; otherwise, update m to m+1, and return to step 503.

For a specific convergence condition for judging whether the interference parameter $C_k^l(n,m+1)$ and the second equalization parameter $\tilde{u}_k^l(n,m)$ converge, reference may be made to the description of the foregoing relevant part. For example, for each definite n, and for each m, a corresponding second maximum data transmission rate $\bar{\mu}_k^l$ may be obtained by using the formula (19). For example, for an $(m+1)^{th}$ iteration, $\bar{\mu}_k^l(n,m+1)$ is calculated according to $C_k^l(n,m+1)$ and $\tilde{u}_k^l(n,m+1)$; and similarly, for an $m^{th}$ iteration, $\bar{\mu}_k^l(n,m)$ is calculated according to $C_k^l(n,m)$ and $\tilde{u}_k^l(n,m)$. If a difference $|\bar{\mu}_k^l(n,m+1) - \bar{\mu}_k^l(n,m)|$ between $\bar{\mu}_k^l(n,m+1)$ and $\bar{\mu}_k^l(n,m)$ is less than a certain set threshold $\epsilon_0$, namely, $|\bar{\mu}_k^l(n,m+1) - \bar{\mu}_k^l(n,m)| < \epsilon_0$, it is considered that a convergence condition is fulfilled between the second equalization parameter $\tilde{u}_k^l(n,m+1)$ and the interference parameter $C_k^l(n,m+1)$.

Step 506: According to the first equalization parameter $u_k^l(n,m)$, the second equalization parameter $\tilde{u}_k^l(n,m)$, and the interference parameter $C_k^l(n,m+1)$, obtain the precoding parameter $V_k^l(n,m)$ and the interference alignment quantization parameter $a_k^l(n,m)$ according to the formulas (30) and (31).

Step 507: Judge whether the first equalization parameter $u_k^l(n,m)$, the second equalization parameter $\tilde{u}_k^l(n,m)$, the interference parameter $C_k^l(n,m+1)$, the precoding parameter $V_k^l(n,m)$, and the interference alignment quantization parameter $a_k^l(n,m)$ fulfill a convergence condition. If yes, end the procedure; otherwise, update n to n+1, and return to step 501.

Judge whether the first equalization parameter $u_k^l(n,m)$, the second equalization parameter $\tilde{u}_k^l(n,m)$, the interference parameter $C_k^l(n,m+1)$, the precoding parameter $V_k^l(n,m)$, and the interference alignment quantization parameter $a_k^l(n,m)$ fulfill a convergence condition. In this case, correspondingly, m may not be considered. For each definite n, correspondingly, a value of m is m that fulfills a convergence condition in step 505. The first equalization parameter $u_k^l(n,m)$, the second equalization parameter $\tilde{u}_k^l(n,m)$, the interference parameter $C_k^l(n,m+1)$, the precoding parameter $V_k^l(n,m)$, and the interference alignment quantization parameter $a_k^l(n,m)$ may be respectively simplified as a parameter that is related to n, for example, a first equalization parameter $u_k^l(n)$, a second equalization parameter $\tilde{u}_k^l(n)$, an interference parameter $C_k^l(n)$, a precoding parameter $V_k^l(n)$, and an interference alignment quantization parameter $a_k^l(n)$. Second maximum data transmission rates $\bar{\mu}_k^l(n)$ and $\bar{\mu}^l(n+1)$ corresponding to n may be obtained by using the formula (19). If a difference $|\bar{\mu}_k^l(n+1)-\bar{\mu}_k^l(n)|$ between $\bar{\mu}_k^l(n+1)$ and $\bar{\mu}_k^l(n)$ is less than a certain set threshold $\epsilon_0$, namely, $|\bar{\mu}_k^l(n+1)-\bar{\mu}_k^l(n)|<\epsilon_0$, it is considered that a convergence condition is fulfilled between the first equalization parameter $u_k^l(n)$, the second equalization parameter $\tilde{u}_k^l(n)$, the interference parameter $C_k^l(n)$, the precoding parameter $V_k^l(n)$, and the interference alignment quantization parameter $a_k^l(n)$. That is, correspondingly, the first equalization parameter $u_k^l(n,m)$, the second equalization parameter $\tilde{u}_k^l(n,m)$, the interference parameter $C_k^l(n,m+1)$, the precoding parameter $V_k^l(n,m)$, and the interference alignment quantization parameter $a_k^l(n,m)$ fulfill the convergence condition.

The foregoing embodiment is described by taking one data stream as an example. In a process of optimizing parameters in a receiving device, it is necessary to unite all data streams of all transmitting devices for optimization. According to the same method, each parameter corresponding to all to-be-sent data streams of all transmitting devices may be optimized.

In the foregoing embodiment, each parameter is optimized based on a principle of maximizing a data rate of a worst receiving device. Similarly, each parameter may be optimized based on a principle of maximizing a total effective data rate. Its process is similar to the optimization process described in the foregoing, and is not detailed herein again.

Through the foregoing embodiments, it is ensured that optimized parameters can be obtained at a receiving device side, so as to obtain a target data stream according to these parameters. The technical solution in this embodiment of the present invention is helpful for filtering out interference, exactly complies with an actual processing procedure of an interfering data stream, and has strong practicability. By using the technical solution in this embodiment, an effective transmission data rate is high, and robustness against a CSI error is high.

Persons of ordinary skill in the art may understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, or an optical disk.

Figure 7:
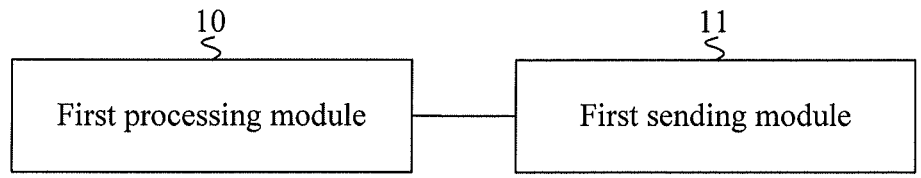
FIG. 7 is a schematic structural diagram of a transmitting device according to Embodiment 5 of the present invention.

FIG. 7 is a schematic structural diagram of a transmitting device according to Embodiment 5 of the present invention.

As shown in FIG. 7, the transmitting device in this embodiment includes a first processing module 10 and a first sending module 11.

The first processing module 10 is configured to use a precoding parameter to perform precoding processing on an $l^{th}$ to-be-sent data stream, where the $l^{th}$ to-be-sent data stream includes a lattice point data stream mapped to a lattice grid and a disturbing data stream that disturbs the lattice point data stream by using a disturbance parameter. The first sending module 11 is configured to send the precoded $l^{th}$ to-be-sent data stream to a $k^{th}$ receiving device, where both l and k are positive integers.

To facilitate the description, the transmitting device in this embodiment may be a $k^{th}$ transmitting device, and a first processing module 10 of the $k^{th}$ transmitting device is configured to perform precoding processing on the $l^{th}$ to-be-sent data stream. The $l^{th}$ to-be-sent data stream is obtained by modulating and mapping an original data stream to a nest-shaped lattice $\Lambda$ in a modulation manner such as QSPK or 16QAM. Data on a lattice point may be disturbed by all kinds of interference, and, corresponding to a data stream on each lattice point, a disturbance exists. The first sending module 11 is connected to the first processing module 10, and is configured to send the $l^{th}$ to-be-sent data stream precoded by the first processing module 10 to the $k^{th}$ receiving device, where both l and k are positive integers.

For an implementation manner and an interaction process of each module in the transmitting device in this embodiment, reference may be made to the relevant description in the method embodiment, which are not detailed herein again. Modules of the transmitting device may be combined together or separated to implement their functions.

With the transmitting device in this embodiment, through two modules, precoding processing is performed on a data stream modulated onto a lattice, and then sends the data stream to a receiving device, so that a data stream receiving device can perform interference alignment processing to solve an interfering data stream, so as to obtain a target data stream. The technical solution in this embodiment of the present invention can be helpful for implementing the interference alignment processing, exactly complies with an actual processing procedure of an interfering data stream, and has strong practicability.

Figure 8:
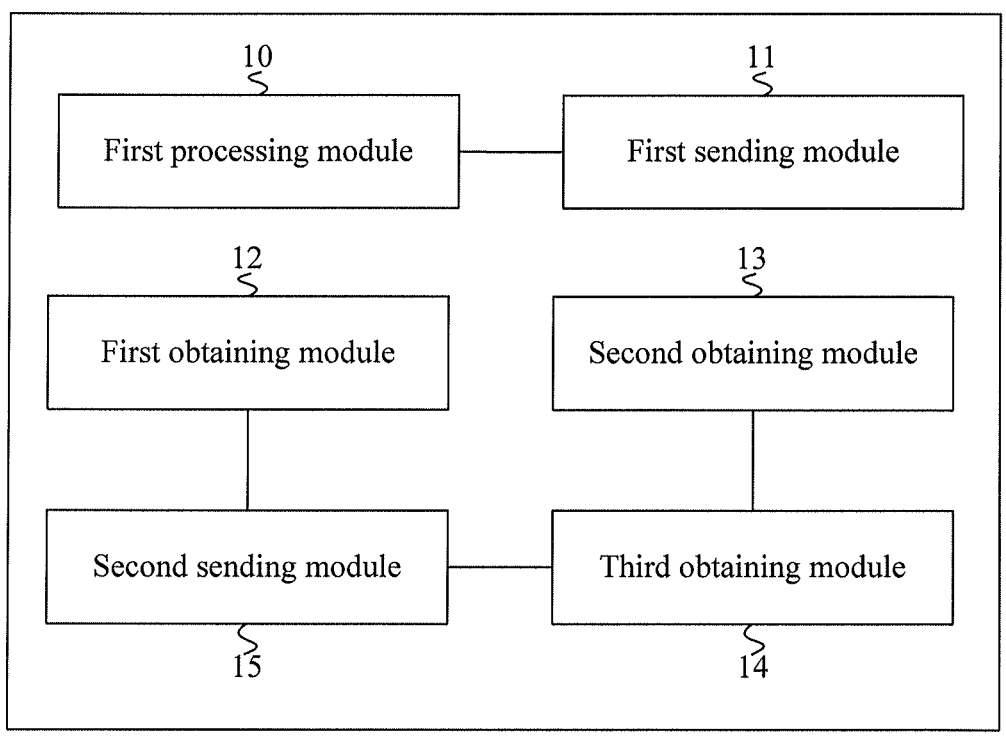
FIG. 8 is a schematic structural diagram of a transmitting device according to Embodiment 6 of the present invention.

FIG. 8 is a schematic structural diagram of a transmitting device according to Embodiment 6 of the present invention. As shown in FIG. 8, on the basis of the embodiment shown in FIG. 7, the transmitting device in this embodiment further includes: a first obtaining module 12, a second obtaining module 13, a third obtaining module 14, and a second sending module 15.

The first obtaining module 12 is configured to obtain a precoding parameter, an interference alignment quantization parameter, a first equalization parameter, a second equalization parameter, and an interference parameter that correspond to an $l^{th}$ to-be-sent data stream. The second obtaining module 13 is configured to obtain a disturbance parameter and an interference alignment quantization parameter that correspond to every to-be-sent data stream of every transmitting device. The third obtaining module 14 is connected to the second obtaining module 13, and is configured to obtain an aggregate interference alignment quantization parameter according to the disturbance parameter and the interference alignment quantization parameter that correspond to every to-be-sent data stream of every transmitting device and are obtained by the second obtaining module 13. The second sending module 13 is connected to the first obtaining module 12 and the third obtaining module 14 respectively, and is configured to send the first equalization parameter, the second equalization parameter, and the interference parameter that are obtained by the first obtaining module 12 and the aggregate interference alignment quantization parameter that is obtained by the third obtaining module 14 to a $k^{th}$ receiving device, so that the $k^{th}$ receiving device obtains a target data stream.

Figure 9:
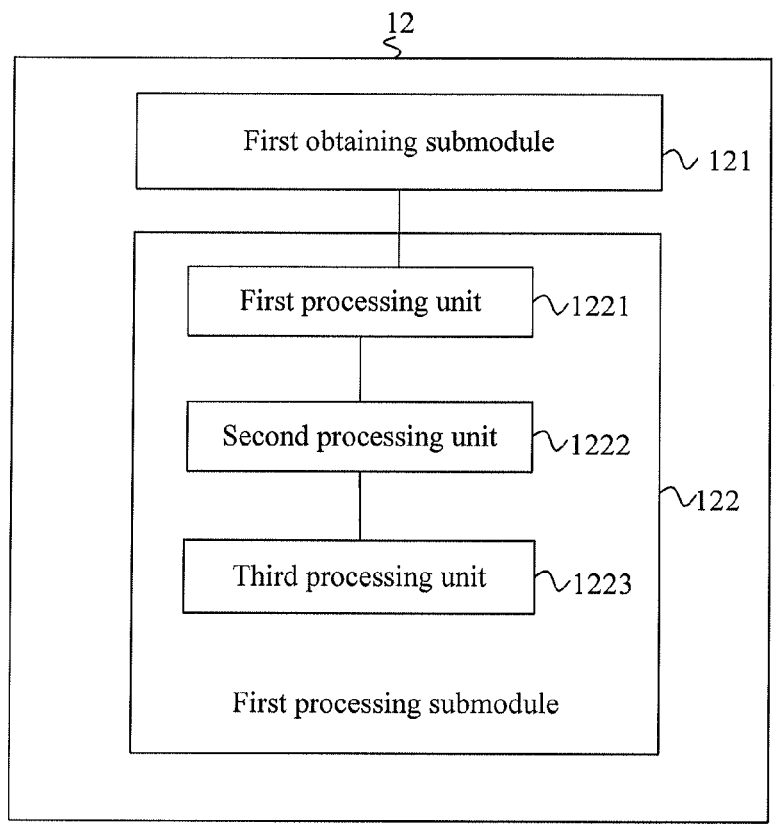
FIG. 9 is a schematic structural diagram of a first obtaining module 12 shown in FIG. 8.

FIG. 9 is a schematic structural diagram of a first obtaining module 12 shown in FIG. 8. As shown in FIG. 9, the first obtaining module 12 includes: a first obtaining submodule 121 and a first processing submodule 122.

The first obtaining submodule 121 is configured to obtain an initialized precoding parameter corresponding to every to-be-sent data stream of every transmitting device, an initialized interference alignment quantization parameter corresponding to every to-be-sent data stream of every transmitting device, and an initialized interference parameter corresponding to an $l^{th}$ to-be-sent data stream. The first processing submodule 122 is connected to the first obtaining submodule 121, and is configured to: according to the precoding parameter corresponding to every to-be-sent data stream of every transmitting device, the interference alignment quantization parameter corresponding to every to-be-sent data stream of every transmitting device, and the interference parameter corresponding to the $l^{th}$ to-be-sent data stream, update a first equalization parameter corresponding to the $l^{th}$ to-be-sent data stream, a second equalization parameter corresponding to the $l^{th}$ to-be-sent data stream, and the interference parameter corresponding to the $l^{th}$ to-be-sent data stream; and according to the first equalization parameter corresponding to the $l^{th}$ to-be-sent data stream, the second equalization parameter corresponding to the $l^{th}$ to-be-sent data stream, and the interference parameter corresponding to the $l^{th}$ to-be-sent data stream, update a precoding parameter corresponding to the $l^{th}$ to-be-sent data stream and an interference alignment quantization parameter corresponding to the $l^{th}$ to-be-sent data stream; repeat the foregoing steps until the precoding parameter corresponding to the $l^{th}$ to-be-sent data stream, the interference alignment quantization parameter corresponding to the $l^{th}$ to-be-sent data stream, the interference parameter corresponding to the $l^{th}$ to-be-sent data stream, the first equalization parameter corresponding to the $l^{th}$ to-be-sent data stream, and the second equalization parameter corresponding to the $l^{th}$ to-be-sent data stream fulfill a convergence condition; and then end the procedure.

Specifically, the first processing submodule 122 further includes a first processing unit 1221, a second processing unit 1222, and a third processing unit 1223.

The first processing unit 1221 is connected to the first obtaining submodule 121, and is configured to: according to the precoding parameter corresponding to every to-be-sent data stream of every transmitting device, the interference alignment quantization parameter corresponding to every to-be-sent data stream of every transmitting device, and the interference parameter corresponding to the $l^{th}$ to-be-sent data stream, update the first equalization parameter corresponding to the $l^{th}$ to-be-sent data stream, the second equalization parameter corresponding to the $l^{th}$ to-be-sent data stream, and the interference parameter corresponding to the $l^{th}$ to-be-sent data stream, where the precoding parameter corresponding to every to-be-sent data stream of every transmitting device, the interference alignment quantization parameter corresponding to every to-be-sent data stream of every transmitting device, and the interference parameter corresponding to the $l^{th}$ to-be-sent data stream are obtained by the first obtaining submodule 121. The second processing unit 1222 is connected to the first processing unit 1221, and is configured to: according to the first equalization parameter corresponding to the $l^{th}$ to-be-sent data stream, the second equalization parameter corresponding to the $l^{th}$ to-be-sent data stream, and the interference parameter corresponding to the $l^{th}$ to-be-sent data stream, update the precoding parameter corresponding to the $l^{th}$ to-be-sent data stream and the interference alignment quantization parameter corresponding to the $l^{th}$ to-be-sent data stream, where the first equalization parameter corresponding to the $l^{th}$ to-be-sent data stream, the second equalization parameter corresponding to the $l^{th}$ to-be-sent data stream, and the interference parameter corresponding to the $l^{th}$ to-be-sent data stream are obtained by the first processing unit 1221. The third processing unit 1223 is connected to the first processing unit 1221 and the second processing unit 1222 respectively, and is configured to repeat corresponding operations of the first processing unit 1221 and the second processing unit 1222 until the precoding parameter corresponding to the $l^{th}$ to-be-sent data stream, the interference alignment quantization parameter corresponding to the $l^{th}$ to-be-sent data stream, the interference parameter corresponding to the $l^{th}$ to-be-sent data stream, the first equalization parameter corresponding to the $l^{th}$ to-be-sent data stream, and the second equalization parameter corresponding to the $l^{th}$ to-be-sent data stream fulfill the convergence condition; and then end the procedure.

The first processing unit 1221 includes a first processing subunit, a second processing subunit, a third processing subunit, and a fourth processing subunit. The first processing subunit is connected to the first obtaining submodule 121, and is configured to: according to the precoding parameter corresponding to every to-be-sent data stream of every transmitting device and the interference alignment quantization parameter corresponding to every to-be-sent data stream of every transmitting device, update the first equalization parameter corresponding to the $l^{th}$ to-be-sent data stream, where the precoding parameter corresponding to every to-be-sent data stream of every transmitting device and the interference alignment quantization parameter corresponding to every to-be-sent data stream of every transmitting device are obtained by the first obtaining submodule 121. The second processing subunit is connected to the first obtaining submodule 121, and is configured to: according to the precoding parameter corresponding to every to-be-sent data stream of every transmitting device, the interference alignment quantization parameter corresponding to every to-be-sent data stream of every transmitting device, and the interference parameter corresponding to the $l^{th}$ to-be-sent data stream, update the second equalization parameter corresponding to the $l^{th}$ to-be-sent data stream, where the precoding parameter corresponding to every to-be-sent data stream of every transmitting device, the interference alignment quantization parameter corresponding to every to-be-sent data stream of every transmitting device, and the interference parameter corresponding to the $l^{th}$ to-be-sent data stream are obtained by the first obtaining submodule 121. The third processing subunit is connected to the first obtaining submodule 121 and the second processing subunit respectively, and is configured to: according to the precoding parameter corresponding to the $l^{th}$ to-be-sent data stream, the interference alignment quantization parameter corresponding to the $l^{th}$ to-be-sent data stream, and the second equalization parameter corresponding to the $l^{th}$ to-be-sent data stream, update the interference parameter corresponding to the $l^{th}$ to-be-sent data stream, where the second equalization parameter is obtained by the second processing subunit. The fourth processing subunit is connected to the second processing subunit and the third processing subunit respectively, and is configured to repeat corresponding operations of the second processing subunit and the third processing subunit until a convergence condition is fulfilled between the second equalization parameter corresponding to the $l^{th}$ to-be-sent data stream and the interference parameter corresponding to the $l^{th}$ to-be-sent data stream; and then end the procedure. Finally, the fourth processing subunit is connected to the second processing unit 1222, and is configured to perform subsequent processing on the finally obtained first equalization parameter, the second equalization parameter corresponding to the $l^{th}$ to-be-sent data stream, and the interference parameter corresponding to the $l^{th}$ to-be-sent data stream.

The first processing subunit is specifically configured to: according to the precoding parameter corresponding to every to-be-sent data stream of every transmitting device and the interference alignment quantization parameter corresponding to every to-be-sent data stream of every transmitting device, use a formula $$(u_k^l) = \underset{u_k^l}{\arg\min}\left(\|u_k^l\|^2 + P\sum_{i,n}\left\|(u_k^l)^H \hat{H}_{ki} V_i^n - a_i^n\right\| + \varepsilon\|V_i^n\|\Box\|u_k^l\|^2\right)$$

to update the first equalization parameter corresponding to the $l^{th}$ to-be-sent data stream.

$u_k^l$ represents a first equalization parameter corresponding to an $l^{th}$ data stream of a $k^{th}$ transmitting device; P represents power of a to-be-sent data stream; $\hat{H}_{ki}$ represents a channel coefficient from an $i^{th}$ transmitting device to a $k^{th}$ receiving device, where $i=1, 2, \ldots K$, and K is the number of transmitting devices; $\varepsilon$ is a neighborhood radius of $\hat{H}_{km}$, and is a constant; $a_i^n$ represents an interference alignment quantization parameter corresponding to an $n^{th}$ data stream of the $i^{th}$ transmitting device; $V_i^n$ represents a precoding parameter corresponding to the $n^{th}$ data stream of the $i^{th}$ transmitting device, where $i=1, 2, \ldots K$, $n=1, 2, \ldots N_i$, and $N_i$ is the number of to-be-sent data streams included in the $i^{th}$ transmitting device.

The second processing subunit is specifically configured to: according to the precoding parameter corresponding to every to-be-sent data stream of every transmitting device, the interference alignment quantization parameter corresponding to every to-be-sent data stream of every transmitting device, and the interference parameter corresponding to the $l^{th}$ to-be-sent data stream, use a formula $$\tilde{u}_k^l = \underset{\tilde{u}_k^l}{\arg\min}\left(\|\tilde{u}_k^l\|^2 + P\sum_{i,n}\left\|\begin{array}{c}(\tilde{u}_k^l)^H \hat{H}_{ki} V_i^n - C_k^l a_i^n - \\ 1_{\{i=k \& n=l\}}\end{array}\right\| + \varepsilon\|V_i^n\|\Box\|\tilde{u}_k^l\|^2\right)$$

to update the second equalization parameter corresponding to the $l^{th}$ to-be-sent data stream.

$\tilde{u}_k^l$ represents a second equalization parameter corresponding to the $l^{th}$ data stream of the $k^{th}$ transmitting device, and $C_k^l$ represents an interference parameter corresponding to the $l^{th}$ data stream of the $k^{th}$ transmitting device.

The third processing subunit is specifically configured to: according to the precoding parameter corresponding to the $l^{th}$ to-be-sent data stream, the interference alignment quantization parameter corresponding to the $l^{th}$ to-be-sent data stream, the first equalization parameter corresponding to the $l^{th}$ to-be-sent data stream, and the second equalization parameter corresponding to the $l^{th}$ to-be-sent data stream, use a formula $$C_k^l = \arg\underset{R\{C_k^l\}\in[R[\tau],R[k]], I\{C_k^l\}\in[I[\tau],I[k]]}{\min} f(C_k^l)$$

to update the interference parameter corresponding to the $l^{th}$ to-be-sent data stream.

A first variable is $\tau=\tilde{C}_k^l(1+j)$, and a second variable is $k=\tilde{C}_k^l+(1+j)$.

$\tilde{C}_k^l$ is a result of widening $C_k^l$ from a complex integer domain $C_k^l=Z+jZ$ to a complex domain $\tilde{C}_k^l \in C$, where Z is a positive integer and C is a complex number.

An intermediate function is $$f(C_k^l) = \sum_{i,n}\left(\left\|(\tilde{u}_k^l)^H \hat{H}_{ki} V_i^n - C_k^l a_i^n - 1_{\{i=k \& n=l\}}\right\| + \varepsilon\|V_i^n\|\Box\|\tilde{u}_k^l\|^2\right).$$

The second processing unit 1222 is specifically configured to: according to the first equalization parameter corresponding to the $l^{th}$ to-be-sent data stream, the second equalization parameter corresponding to the $l^{th}$ to-be-sent data stream, and the interference parameter corresponding to the $l^{th}$ to-be-sent data stream, use the precoding parameter and the interference alignment quantization parameter that correspond to the $l^{th}$ to-be-sent data stream and correspond to a first maximum transmission data rate $\mu_k^l$ and a second maximum transmission data rate of obtaining functions $$\mu_k^l = \log\frac{P}{g_k^l(V_k^l, a_k^l)} \text{ and } \tilde{\mu}_k^l = \log\frac{P}{\tilde{g}_k^l(V_k^l, a_k^l)},$$

to update the precoding parameter corresponding to the $l^{th}$ to-be-sent data stream and the interference alignment quantization parameter corresponding to the $l^{th}$ to-be-sent data stream.

$g_k^l(V, a_k^l)$ represents a first residual interference and noise function.

Specifically, $$g_k^l(V, a_k^l) = \|u_k^l\|^2 + P\sum_{i,n}\left\|(u_k^l)^H \hat{H}_{km} V_i^n - a_i^n\right\| + \varepsilon\|V_i^n\|\Box\|u_k^l\|^2.$$

$\tilde{g}_k^l(V, a_k^l)$ represents a second residual interference and noise function.

Specifically, $$\tilde{g}_k^l(V, a_k^l) =$$
$$\|\tilde{u}_k^l\|^2 + P\sum_{i,n}\left\|(\tilde{u}_k^l)^H \hat{H}_{km} V_i^n - C_k^l a_i^n - 1_{\{i=k \& n=l\}}\right\| + \varepsilon\|V_i^n\|\Box\|\tilde{u}_k^l\|^2.$$

$\mu_k^l$ represents the first maximum transmission data rate corresponding to the $l^{th}$ data stream of the $k^{th}$ transmitting device, and $\tilde{\mu}_k^l$ represents the second maximum transmission data rate corresponding to the $l^{th}$ data stream of the $k^{th}$ transmitting device.

For an implementation manner and an interaction process of each module in the transmitting device in this embodiment, reference may be made to the relevant description in the method embodiment, which are not detailed herein again. Modules of the transmitting device may be combined together or separated to implement their functions.

The transmitting device in this embodiment further includes design of various parameters used to solve an interfering data stream in a process of sending a data stream and receiving a data stream. The technical solution in this embodiment can be helpful for filtering out an interfering data stream, exactly complies with an actual processing procedure of an interfering data stream, and has strong practicability.

Figure 10:
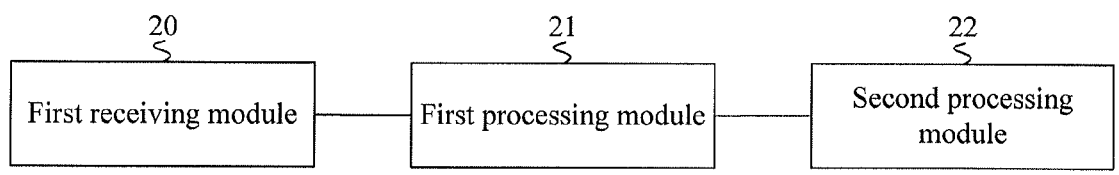
FIG. 10 is a schematic structural diagram of a receiving device according to Embodiment 7 of the present invention.

FIG. 10 is a schematic structural diagram of a receiving device according to Embodiment 7 of the present invention. As shown in FIG. 10, the receiving device in this embodiment includes a first receiving module 20, a first processing module 21, and a second processing module 22.

The first receiving module 20 is configured to receive data streams, where the data streams include a target data stream sent from a $k^{th}$ transmitting device and an aggregate interfering data stream other than the target data stream. The first processing module 21 is configured to: according to a pre-stored first equalization parameter and a pre-stored aggregate interference alignment quantization parameter, solve aggregate interference for the data streams received by the first receiving module 20, so as to obtain the aggregate interfering data stream from the data streams. The second processing module 22 is connected to the first processing module 21, and is configured to: according to a pre-stored second equalization parameter, a pre-stored interference parameter, and the pre-stored aggregate interfering data stream, process the data streams obtained by the first processing module 21, so as to obtain the target data stream.

For an implementation manner and an interaction process of each module in the receiving device in this embodiment, reference may be made to the relevant description in the method embodiment, which are not detailed herein again. Modules of the transmitting device may be combined together or separated to implement their functions.

With the receiving device in this embodiment, aggregate interference is solved for a received data stream, and then each parameter corresponding to the $l^{th}$ to-be-sent data stream of the transmitting device is optimized through the foregoing steps, and each parameter is sent to the receiving device, so that the receiving device filters out interference according to these parameters, and obtains a target data stream in the $l^{th}$ to-be-sent data stream. The technical solution in this embodiment of the present invention can be helpful for filtering out interference, exactly complies with an actual processing procedure of an interfering data stream, and has strong practicability.

On the basis of the foregoing embodiment, the receiving device may further include a second receiving module, configured to receive a first equalization parameter, an aggregate interference alignment quantization parameter, a second equalization parameter, and an interference parameter that are sent by the $k^{th}$ transmitting device.

Figure 11:
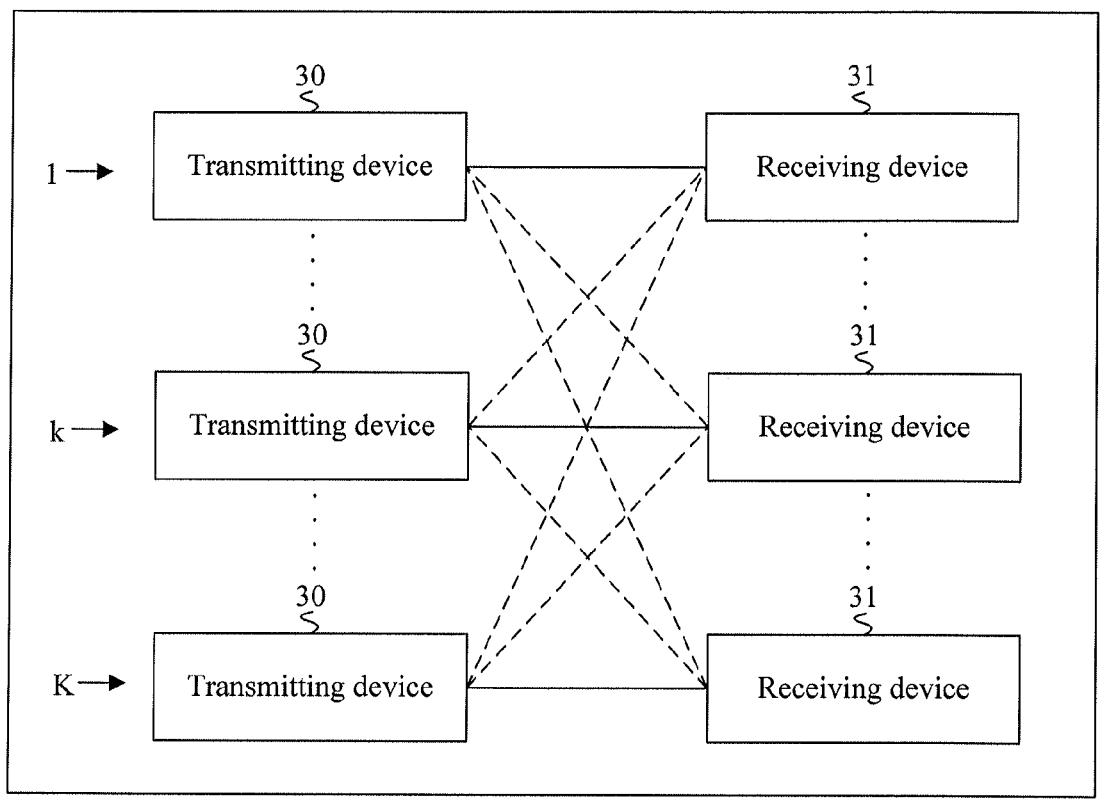
FIG. 11 is a schematic structural diagram of a data stream processing system according to Embodiment 8 of the present invention.

FIG. 11 is a schematic structural diagram of a data stream processing system according to Embodiment 8 of the present invention. As shown in FIG. 11, the data stream processing system in this embodiment includes K transmitting devices 30 and K receiving devices 31, where K is a positive integer that is greater than 1.

A transmitting device 30 is configured to: use a precoding parameter to perform precoding processing on an $l^{th}$ to-be-sent data stream, where the $l^{th}$ to-be-sent data stream includes a lattice point data stream mapped to a lattice grid; and send the precoded $l^{th}$ to-be-sent data stream to a corresponding receiving device 31, for example, a $k^{th}$ transmitting device 30 sends the $l^{th}$ to-be-sent data stream to a $k^{th}$ receiving device 31, where l is a positive integer.

A receiving device 31 is configured to receive data streams, where the data streams include an $l^{th}$ data stream sent from the transmitting device 30 and an aggregate interfering data stream other than the $l^{th}$ data stream; solve aggregate interference for the data streams according to a pre-stored first equalization parameter and a pre-stored aggregate interference alignment quantization parameter, so as to obtain the aggregate interfering data stream from the data streams; and process the data streams according to a pre-stored second equalization parameter, a pre-stored interference parameter, and the pre-stored aggregate interfering data stream, so as to obtain the $l^{th}$ data stream.

The transmitting device 30 and the receiving device 31 in this embodiment may adopt the transmitting device and the receiving device in the foregoing device embodiment. The transmitting device is implemented according to the data stream processing method in the corresponding method embodiment, and the receiving device is implemented according to the data stream processing method in the corresponding method embodiment. Reference may be made to the description of the foregoing embodiments, so that details are not described herein again.

With the data stream processing system in this embodiment, interference can be filtered out effectively. Meanwhile, by using the technical solution in this embodiment, an effective transmission data rate is high, and robustness against a CSI error is high. Moreover, the technical solution in this embodiment exactly complies with an actual processing procedure of an interfering data stream and has strong practicability.

Finally, it should be noted that the foregoing embodiments are merely provided for describing the technical solutions of the present invention, but are not intended to limit the present invention. It should be understood by persons of ordinary skill in the art that although the present invention has been described in detail with reference to the embodiments, modifications may still be made to the technical solutions described in the embodiments, or equivalent replacements may be made to some technical features in the technical solutions, as long as such modifications or replacements do not cause the essence of corresponding technical solutions to depart from the spirit and scope of the technical solutions in the embodiments of the present invention.

What is claimed is:

1. A data stream processing method, comprising:
   using a precoding parameter to perform precoding processing on an $l^{th}$ to-be-sent data stream of a $k^{th}$ transmitting device, wherein the $l^{th}$ to-be-sent data stream comprises a lattice point data stream mapped to a lattice grid and a disturbing data stream that disturbs the lattice point data stream by using a disturbance parameter; and
   sending the precoded $l^{th}$ to-be-sent data stream to a $k^{th}$ receiving device, wherein both l and k are positive integers,
   wherein the method further comprises:
   obtaining the precoding parameter, an interference alignment quantization parameter, a first equalization parameter, a second equalization parameter and an interference parameter that correspond to the $l^{th}$ to-be-sent data stream;

obtaining a disturbance parameter and an interference alignment quantization parameter that correspond to all to-be-sent data streams of all transmitting devices;

obtaining an aggregate interference alignment quantization parameter according to the disturbance parameter and the interference alignment quantization parameter that correspond to all the to-be-sent data streams of all the transmitting devices; and sending the first equalization parameter, the aggregate interference alignment quantization parameter, the second equalization parameter and the interference parameter to the $k^{th}$ receiving device.

2. The data stream processing method according to claim 1, wherein the step of obtaining the precoding parameter, the interference alignment quantization parameter, the first equalization parameter, the second equalization parameter and the interference parameter that correspond to the $l^{th}$ to-be-sent data stream comprises:

obtaining an initialized precoding parameter corresponding to the all to-be-sent data streams of the all transmitting devices, an initialized interference alignment quantization parameter corresponding to the all to-be-sent data streams of the all transmitting devices, and an initialized interference parameter corresponding to the $l^{th}$ to-be-sent data stream; and according to the initialized precoding parameter and the initialized interference alignment quantization parameter corresponding to the all to-be-sent data streams of the all transmitting devices, and the interference parameter corresponding to the $l^{th}$ to-be-sent data stream, updating the first equalization parameter, the second equalization parameter and the interference parameter corresponding to the $l^{th}$ to-be-sent data stream; and according to the first equalization parameter, the second equalization parameter, and the interference parameter corresponding to the $l^{th}$ to-be-sent data stream, updating the precoding parameter corresponding to the $l^{th}$ to-be-sent data stream and the interference alignment quantization parameter corresponding to the $l^{th}$ to-be-sent data stream.

3. The data stream processing method according to claim 2, wherein:

the step of updating the first equalization parameter, the second equalization parameter, and the interference parameter corresponding to the $l^{th}$ to-be-sent data stream comprises:

according to the initialized precoding parameter and the initialized interference alignment quantization parameter corresponding to the all to-be-sent data streams of the all transmitting devices, updating the first equalization parameter corresponding to the $l^{th}$ to-be-sent data stream; and according to the initialized precoding parameter and the initialized interference alignment quantization parameter corresponding to the all to-be-sent data streams of the all transmitting devices, and the interference parameter corresponding to the $l^{th}$ to-be-sent data stream, updating the second equalization parameter corresponding to the $l^{th}$ to-be-sent data stream; and according to the precoding parameter corresponding to the $l^{th}$ to-be-sent data stream, the interference alignment quantization parameter corresponding to the $l^{th}$ to-be-sent data stream, and the second equalization parameter corresponding to the $l^{th}$ to-be-sent data stream, updating the interference parameter corresponding to the $l^{th}$ to-be-sent data stream.

4. The data stream processing method according to claim 3, wherein:

the step of updating, according to the initialized precoding parameter and the initialized interference alignment quantization parameter corresponding to the all to-be-sent data streams of the all transmitting devices, the first equalization parameter corresponding to the $l^{th}$ to-be-sent data stream comprises:

using a formula $$(u_k^l) = \operatorname*{argmin}_{u_k^l}\left(\|u_k^l\|^2 + P\sum_{i,n}\left|(u_k^l)^H \hat{H}_{ki} V_i^n - a_i^n\right| + \varepsilon\|V_i^n\|\square\|u_k^l\|^2\right)$$

to update the first equalization parameter corresponding to the $l^{th}$ to-be-sent data stream, wherein:

$u_k^l$ represents the first equalization parameter corresponding to the $l^{th}$ to-be-sent data stream of the $k^{th}$ transmitting device; P represents a power of any one to-be-sent data stream; $\hat{H}_{ki}$ represents a channel coefficient from an $i^{th}$ transmitting device to the $k^{th}$ receiving device, wherein i=1, 2, ... K, and K represents the number of transmitting devices; $\epsilon$ is a neighborhood radius of $\hat{H}_{ki}$, and is a constant; $a_i^n$ represents an interference alignment quantization parameter corresponding to an $n^{th}$ to-be-sent data stream of the $i^{th}$ transmitting device; $V_i^n$ represents a precoding parameter corresponding to the $n^{th}$ to-be-sent data stream of the $i^{th}$ transmitting device, wherein i=1, 2, ... K; $N_i$ represents the number of to-be-sent data streams corresponding to the $i^{th}$ transmitting device; and n=1, 2, ... $N_i$, and $N_i$ is the number of to-be-sent data streams of the $i^{th}$ transmitting device.

5. The data stream processing method according to claim 3, wherein:

the step of updating the second equalization parameter corresponding to the $l^{th}$ to-be-sent data stream comprises:

using a formula $$\tilde{u}_k^l = \operatorname*{argmin}_{\tilde{u}_k^l}\left(\|\tilde{u}_k^l\|^2 + P\sum_{i,n}\left|(\tilde{u}_k^l)^H \hat{H}_{ki} V_i^n - C_k^l a_i^n - 1_{\{i=k \& n=l\}}\right| + \varepsilon\|V_i^n\|\square\|\tilde{u}_k^l\|^2\right)$$

to update the second equalization parameter corresponding to the $l^{th}$ to-be-sent data stream, wherein:

$\tilde{u}_k^l$ represents the second equalization parameter corresponding to the $l^{th}$ data stream of the $k^{th}$ transmitting device; P represents a power of any one to-be-sent data stream; $\hat{H}_{ki}$ represents a channel coefficient from an $i^{th}$ transmitting device to the $k^{th}$ receiving device, wherein i=1, 2, ... K, and K represents the number of transmitting devices; $\epsilon$ is a neighborhood radius of $\hat{H}_{ki}$, and is a constant; $a_i^n$ represents an interference alignment quantization parameter corresponding to an $n^{th}$ to-be-sent data stream of the $i^{th}$ transmitting device; $V_i^n$ represents a precoding parameter corresponding to the $n^{th}$ to-be-sent data stream of the $i^{th}$ transmitting device, wherein i=1, 2, ... K; and n=1, 2, ... $N_i$, and $N_i$ is the number of to-be-sent data streams of the $i^{th}$ transmitting device.

6. The data stream processing method according to claim 3, wherein:

the step of updating the interference parameter corresponding to the $l^{th}$ to-be-sent data stream comprises:

using a formula $$C_k^l = \arg\min_{R\{C_k^l\}\in[R[\tau],R[k]], I\{C_k^l\}\in[I[\tau],I[k]]} f(C_k^l)$$

to update the interference parameter corresponding to the $l^{th}$ to-be-sent data stream, wherein
a first variable is $\tau=\tilde{C}_k^l-(1+j)$, and a second variable is $k=\tilde{C}_k^l+(1+j)$;
$\tilde{C}_k^l$ is a result of widening $C_k^l$ from a complex integer domain $C_k^l=Z+jZ$ to a complex domain $\tilde{C}_k^l \in C$, wherein Z is a positive integer and C is a complex number; and
an intermediate function is $$f(C_k^l) = \sum_{i,n}\left\|(\tilde{u}_k^l)^H \hat{H}_{ki} V_i^n - C_k^l a_i^n - 1_{\{i=k \& n=l\}}\right| + \varepsilon\|V_i^n\|\Box\|\tilde{u}_k^l\|\right)^2$$

wherein:
$C_k^l$ represents the interference parameter corresponding to the $l^{th}$ data stream; $a_i^n$ represents an interference alignment quantization parameter corresponding to an $n^{th}$ to-be-sent data stream of an $i^{th}$ transmitting device; $V_i^n$ represents a precoding parameter corresponding to the $n^{th}$ to-be-sent data stream of the $i^{th}$ transmitting device, wherein $i=1, 2, \ldots K$, and K represents the number of transmitting devices; $n=1, \ldots N_i$, and $N_i$ is the number of to-be-sent data streams of the $i^{th}$ transmitting device; $\tilde{u}_k^l$ represents a second equalization parameter corresponding to the $l^{th}$ to-be-sent data stream; $\hat{H}_{ki}$ represents a channel coefficient from the $i^{th}$ transmitting device to the $k^{th}$ receiving device, wherein $i=1, 2, \ldots K$; and $\varepsilon$ is a neighborhood radius of $\hat{H}_{ki}$, and is a constant.

7. The data stream processing method according to claim 2, wherein:
the step of updating the precoding parameter corresponding to the $l^{th}$ to-be-sent data stream and the interference alignment quantization parameter corresponding to the $l^{th}$ to-be-sent data stream comprises:
using the precoding parameter and the interference alignment quantization parameter that correspond to the $l^{th}$ to-be-sent data stream and correspond to a first maximum transmission data rate $\mu_k^l$ and a second maximum transmission data rate $\tilde{\mu}_k^l$ of obtaining functions $$\mu_k^l = \log\frac{P}{g_k^l(V_k^l, a_k^l)} \text{ and } \tilde{\mu}_k^l = \log\frac{P}{\tilde{g}_k^l(V_k^l, a_k^l)},$$

to update the precoding parameter corresponding to the $l^{th}$ to-be-sent data stream and the interference alignment quantization parameter corresponding to the $l^{th}$ to-be-sent data stream, wherein:
$g_k^l(V,a_k^l)$ represents a first residual interference and noise function,
and $$g_k^l(V, a_k^l) = \|u_k^l\|^2 + P\sum_{i,n}\left\|(u_k^l)^H \hat{H}_{ki} V_i^n - a_i^n\right| + \varepsilon\|V_i^n\|\Box\|u_k^l\|\right)^2;$$

$\tilde{g}_k^l(V,a_k^l)$ represents a second residual interference and noise function, and $$\tilde{g}_k^l(V, a_k^l) = \|\tilde{u}_k^l\|^2 + P\sum_{i,n}\left\|(\tilde{u}_k^l)^H \hat{H}_{ki} V_i^n - C_k^l a_i^n - 1_{\{i=k \& n=l\}}\right| + \varepsilon\|V_i^n\|\Box\|\tilde{u}_k^l\|\right)^2,$$

wherein $\mu_k^l$ represents the first maximum transmission data rate corresponding to the $l^{th}$ to-be-sent data stream; $\tilde{\mu}_k^l$ represents the second maximum transmission data rate corresponding to the $l^{th}$ to-be-sent data stream; $\mu_k^l$ represents the first equalization parameter corresponding to the $l^{th}$ to-be-sent data stream; $\tilde{\mu}_k^l$ represents the second equalization parameter corresponding to the $l^{th}$ to-be-sent data stream; P represents a power of any one to-be-sent data stream; $\hat{H}_{ki}$ represents a channel coefficient from an $i^{th}$ transmitting device to the $k^{th}$ receiving device, wherein $i=1, 2, \ldots K$, and K represents the number of transmitting devices; $\varepsilon$ is a neighborhood radius of $\hat{H}_{ki}$, and is a constant; $V_i^n$ represents a precoding parameter corresponding to an $n^{th}$ to-be-sent data stream of the $i^{th}$ transmitting device; $a_i^n$ represents an interference alignment quantization parameter corresponding to the $n^{th}$ to-be-sent data stream of the $i^{th}$ transmitting device, wherein $i=1, 2, \ldots K$; and $n=1, 2, \ldots N_i$, and $N_i$ is the number of to-be-sent data streams of the $i^{th}$ transmitting device.

8. A data stream processing method, comprising:
receiving data streams, wherein the data streams comprise an $l^{th}$ data stream sent from a $k^{th}$ transmitting device and an aggregate interfering data stream, wherein both l and k are positive integers;
solving aggregate interference for the data streams according to a first equalization parameter and an aggregate interference alignment quantization parameter, so as to obtain the aggregate interfering data stream from the data streams; and
processing the data streams according to a second equalization parameter, an interference parameter, and the aggregate interfering data stream, so as to obtain the $l^{th}$ data stream.

9. The data stream processing method according to claim 8, wherein:
the $l^{th}$ data stream comprises a lattice point data stream mapped to a lattice grid, or comprises a lattice point data stream mapped to a lattice grid and a disturbing data stream that disturbs the lattice point data stream by using a disturbance parameter.

10. The data stream processing method according to claim 8, further comprising:
receiving the first equalization parameter, the aggregate interference alignment quantization parameter, the second equalization parameter, and the interference parameter that are sent by the $k^{th}$ transmitting device.

11. A transmitting device, comprising:
a processing device configured to use a precoding parameter to perform a precoding processing on an $l^{th}$ to-be-sent data stream of the transmitting device, wherein the $l^{th}$ to-be-sent data stream comprises a lattice point data stream mapped to a lattice grid;
a transmitter configured to send the precoded $l^{th}$ to-be-sent data stream to a $k^{th}$ receiving device, wherein both l and k are positive integers; and
a receiver configured to:
obtain the precoding parameter, an interference alignment quantization parameter, a first equalization parameter, a second equalization parameter, and an interference parameter that correspond to the $l^{th}$ to-be-sent data stream;

obtain a disturbance parameter and an interference alignment quantization parameter that correspond to all to-be-sent data streams of multiple transmitting devices including the transmitting device that sends the precoded $l^{th}$ to-be-sent data stream; and obtain an aggregate interference alignment quantization parameter according to the disturbance parameter and the interference alignment quantization parameter that correspond to the all to-be-sent data streams of the multiple transmitting devices, wherein the transmitter is further configured to send the first equalization parameter, the aggregate interference alignment quantization parameter, the second equalization parameter, and the interference parameter to the $k^{th}$ receiving device.

12. The transmitting device according to claim 11, wherein the receiver is configured to obtain an initialized precoding parameter corresponding to the all to-be-sent data streams of the multiple transmitting devices, an initialized interference alignment quantization parameter corresponding to the all to-be-sent data streams of the multiple transmitting devices, and an initialized interference parameter corresponding to the $l^{th}$ to-be-sent data stream, wherein the processing device is configured to: according to the initialized precoding parameter corresponding to the all to-be-sent data streams of the multiple transmitting devices, the interference alignment quantization parameter corresponding to the all to-be-sent data streams of the multiple transmitting devices and the interference parameter corresponding to the $l^{th}$ to-be-sent data stream, update the first equalization parameter corresponding to the $l^{th}$ to-be-sent data stream, the second equalization parameter corresponding to the $l^{th}$ to-be-sent data stream, and the interference parameter corresponding to the $l^{th}$ to-be-sent data stream; and according to the first equalization parameter corresponding to the $l^{th}$ to-be-sent data stream, the second equalization parameter corresponding to the $l^{th}$ to-be-sent data stream, and the interference parameter corresponding to the $l^{th}$ to-be-sent data stream, update the precoding parameter corresponding to the $l^{th}$ to-be-sent data stream and the interference alignment quantization parameter corresponding to the $l^{th}$ to-be-sent data stream.

13. The transmitting device according to claim 12, wherein the processing device is configured to:

according to the initialized precoding parameter corresponding to the all to-be-sent data streams of the multiple transmitting devices, the interference alignment quantization parameter corresponding to the all to-be-sent data streams of the multiple transmitting devices and the interference parameter corresponding to the $l^{th}$ to-be-sent data stream, update the first equalization parameter corresponding to the $l^{th}$ to-be-sent data stream, the second equalization parameter corresponding to the $l^{th}$ to-be-sent data stream and the interference parameter corresponding to the $l^{th}$ to-be-sent data stream;

according to the first equalization parameter corresponding to the $l^{th}$ to-be-sent data stream, the second equalization parameter corresponding to the $l^{th}$ to-be-sent data stream and the interference parameter corresponding to the $l^{th}$ to-be-sent data stream, update the precoding parameter corresponding to the $l^{th}$ to-be-sent data stream and the interference alignment quantization parameter corresponding to the $l^{th}$ to-be-sent data stream.

14. The transmitting device according to claim 13, wherein the processing device is configured to:

according to the initialized precoding parameter corresponding to the all to-be-sent data streams of the multiple transmitting devices and the interference alignment quantization parameter corresponding to the all to-be-sent data streams of the multiple transmitting devices, update the first equalization parameter corresponding to the $l^{th}$ to-be-sent data stream;

according to the initialized precoding parameter corresponding to the all to-be-sent data streams of the multiple transmitting devices, the interference alignment quantization parameter corresponding to the all to-be-sent data streams of the multiple transmitting devices and the interference parameter corresponding to the $l^{th}$ to-be-sent data stream, update the second equalization parameter corresponding to the $l^{th}$ to-be-sent data stream; and according to the precoding parameter corresponding to the $l^{th}$ to-be-sent data stream, the interference alignment quantization parameter corresponding to the $l^{th}$ to-be-sent data stream and the second equalization parameter corresponding to the $l^{th}$ to-be-sent data stream, update the interference parameter corresponding to the $l^{th}$ to-be-sent data stream.

15. The transmitting device according to claim 14, wherein the processing device is configured to use a formula $$(u_k^l) = \underset{u_k^l}{\operatorname{argmin}} \left( \|u_k^l\|^2 + P\sum_{i,n} \left| (u_k^l)^H \hat{H}_{ki} V_i^n - a_i^n \right| + \varepsilon \|V_i^n\| \square \|u_k^l\|^2 \right)$$

to update the first equalization parameter corresponding to the $l^{th}$ to-be-sent data stream, wherein $u_k^l$ represents the first equalization parameter corresponding to the $l^{th}$ to-be-sent data stream, and k represents that the transmitting device sending the $l^{th}$ to-be-sent data stream is the $k^{th}$ transmitting device in the multiple transmitting devices; P represents a power of any one of the all to-be-sent data streams; $\hat{H}_{ki}$ represents a channel coefficient from an $i^{th}$ transmitting device to the $k^{th}$ receiving device, wherein i=1, 2, ... K, and K represents the number of transmitting devices; $\epsilon$ is a neighborhood radius of $\hat{H}_{ki}$, and is a constant; $a_i^n$ represents an interference alignment quantization parameter corresponding to an $n^{th}$ to-be-sent data stream of the $i^{th}$ transmitting device; $V_i^n$ represents a precoding parameter corresponding to the $n^{th}$ to-be-sent data stream of the $i^{th}$ transmitting device, wherein i=1, 2, ... K, and K represents the number of transmitting devices; and n=1, 2, ... $N_i$, and $N_i$ is the number of to-be-sent data streams of the $i^{th}$ transmitting device.

16. The transmitting device according to claim 14, wherein the processing device is configured to use a formula $$\tilde{u}_k^l =$$

$$\underset{\tilde{u}_k^l}{\operatorname{argmin}} \left( \|\tilde{u}_k^l\|^2 + P\sum_{i,n} \left| (\tilde{u}_k^l)^H \hat{H}_{ki} V_i^n - C_k^l a_i^n - 1_{\{i=k \& n=l\}} \right| + \varepsilon \|V_i^n\| \square \|\tilde{u}_k^l\|^2 \right)$$

to update the second equalization parameter corresponding to the $l^{th}$ to-be-sent data stream, wherein $\tilde{u}_k^l$ represents the second equalization parameter corresponding to an $l^{th}$ to-be-sent data stream, and k represents that the transmitting device sending the $l^{th}$ to-be-sent data stream is the $k^{th}$ transmitting device; P represents a power of any one of the all to-be-sent data streams; $\hat{H}_{ki}$ represents a channel coefficient from an $i^{th}$ transmitting device to the $k^{th}$ receiving device, wherein i=1, 2, ... K, and K represents the number of transmitting devices; $\epsilon$ is a neighborhood radius of $\hat{H}_{ki}$, and is a constant; $a_i^n$ represents an interference alignment quantization parameter corresponding to an $n^{th}$ to-be-sent data stream of the $i^{th}$ transmitting device; $V_i^n$ represents a precoding parameter corresponding to the $n^{th}$ to-be-sent data stream of the $i^{th}$ transmitting device, wherein i=1, 2, ... K; and n=1, 2, ... $N_i$, and $N_i$ is the number of to-be-sent data streams of the $i^{th}$ transmitting device.

17. The transmitting device according to claim 14, wherein the processing device is configured to: use a formula $$C_k^l = \arg \min_{R\{C_k^l\}\in[R(\tau),R(k)], I\{C_k^l\}\in[I(\tau),I(k)]} f(C_k^l)$$

to update the interference parameter corresponding to the $l^{th}$ to-be-sent data stream, wherein a first variable is $\tau = \tilde{C}_k^l - (1+j)$, and a second variable is $k = \tilde{C}_k^l + (1+j)$; $\tilde{C}_k^l$ is a result of widening $C_k^l$ from a complex integer domain $C_k^l = Z + jZ$ to a complex domain $\tilde{C}_k^l \in C$, Z is a positive integer and C is a complex number; and an intermediate function is $$f(C_k^l) = \sum_{i,n} \left\| (\tilde{u}_k^l)^H \hat{H}_{ki} V_i^n - C_k^l a_i^n - 1_{\{i=k \& n=l\}} \right| + \epsilon \|V_i^n\|\Box\|\tilde{u}_k^l\|\right\|^2 \Bigg),$$

wherein $C_k^l$ represents the interference parameter corresponding to the $l^{th}$ to-be-sent data stream, and k represents that the transmitting device sending the $l^{th}$ to-be-sent data stream is the $k^{th}$ transmitting device of the multiple transmitting devices; $a_i^n$ represents an interference alignment quantization parameter corresponding to an $n^{th}$ to-be-sent data stream of an $i^{th}$ transmitting device; $V_i^n$ represents a precoding parameter corresponding to the $n^{th}$ to-be-sent data stream of the $i^{th}$ transmitting device, wherein i=1, 2, ... K, and K represents the number of transmitting devices; n=1, 2, ... $N_i$, and $N_i$ is the number of to-be-sent data streams of the $i^{th}$ transmitting device; $\tilde{u}_k^l$ represents the second equalization parameter corresponding to the $l^{th}$ to-be-sent data stream; $\hat{H}_{ki}$ represents a channel coefficient from the $i^{th}$ transmitting device to the $k^{th}$ receiving device, wherein i=1, 2, ... K; and $\epsilon$ is a neighborhood radius of $\hat{H}_{ki}$, and is a constant.

18. The transmitting device according to claim 13, wherein:

the processing device is configured to use the precoding parameter and the interference alignment quantization parameter that correspond to the $l^{th}$ to-be-sent data stream and correspond to a first maximum transmission data rate $\mu_k^l$ and a second maximum transmission data rate $\tilde{\mu}_k^l$ of obtaining functions $$\mu_k^l = \log \frac{P}{g_k^l(V_k^l, a_k^l)} \text{ and } \tilde{\mu}_k^l = \log \frac{P}{\tilde{g}_k^l(V_k^l, a_k^l)},$$

to update the precoding parameter corresponding to the $l^{th}$ to-be-sent data stream and the interference alignment quantization parameter corresponding to the $l^{th}$ to-be-sent data stream, wherein $g_k^l(V, a_k^l)$ represents a first residual interference and noise function, and $$g_k^l(V, a_k^l) = \|u_k^l\|^2 + P\sum_{i,n} \left\| (u_k^l)^H \hat{H}_{ki} V_i^n - a_i^n \right| + \epsilon \|V_i^n\|\Box\|u_k^l\| \right\|^2;$$

$\tilde{g}_k^l(V, a_k^l)$ represents a second residual interference and noise function, and $$\tilde{g}_k^l(V, a_k^l) = \|\tilde{u}_k^l\|^2 + P\sum_{i,n} \left\| (\tilde{u}_k^l)^H \hat{H}_{ki} V_i^n - C_k^l a_i^n - 1_{\{i=k \& n=l\}} \right| + \epsilon \|V_i^n\|\Box\|\tilde{u}_k^l\| \right\|^2,$$

wherein $\mu_k^l$ is corresponding to the $l^{th}$ to-be-sent data stream; k represents that the transmitting device sending the $l^{th}$ to-be-sent data stream is the $k^{th}$ transmitting device of the multiple transmitting devices; $\tilde{\mu}_k^l$ is corresponding to the $l^{th}$ data stream; $u_k^l$ represents the first equalization parameter corresponding to the $l^{th}$ to-be-sent data stream; $\tilde{u}_k^l$ represents the second equalization parameter corresponding to the $l^{th}$ to-be-sent data stream; P represents a power of any one of the all to-be-sent data streams; $\hat{H}_{ki}$ represents a channel coefficient from an $i^{th}$ transmitting device to the $k^{th}$ receiving device, wherein i=1, 2, ... K, and K represents the number of transmitting devices; $\epsilon$ is a neighborhood radius of $\hat{H}_{ki}$, and is a constant; $V_i^n$ represents a precoding parameter corresponding to an $n^{th}$ to-be-sent data stream of the $i^{th}$ transmitting device; $a_i^n$ represents an interference alignment quantization parameter corresponding to the $n^{th}$ to-be-sent data stream of the $i^{th}$ transmitting device, wherein i=1, 2, ... K; and n=1, 2, ... $N_i$, and $N_i$ is the number of to-be-sent data streams of the $i^{th}$ transmitting device.

19. A receiving device, comprising:
a receiver configured to receive data streams, wherein the data streams comprise an $l^{th}$ data stream sent from a $k^{th}$ transmitting device and an aggregate interfering data stream, wherein both l and k are positive integers; and
a processing device configured to solve aggregate interference for the data streams according to a pre-stored first equalization parameter and a pre-stored aggregate interference alignment quantization parameter, so as to obtain the aggregate interfering data stream from the data streams; and process the data streams according to a pre-stored second equalization parameter, a pre-stored interference parameter, and the aggregate interfering data stream, so as to obtain the $l^{th}$ data stream.

20. The receiving device according to claim 19, wherein the receiver is configured to receive the first equalization parameter, the aggregate interference alignment quantization parameter, the second equalization parameter, and the interference parameter that are sent by the $k^{th}$ transmitting device.

21. A data stream processing system, comprising:
a plurality of transmitting devices including a first transmitting device configured to: use a precoding parameter to perform precoding processing on an $l^{th}$ to-be-sent data stream of the first transmitting device, wherein the $l^{th}$ to-be-sent data stream comprises a lattice point data stream mapped to a lattice grid; and send data streams including the precoded $l^{th}$ to-be-sent data stream and an aggregate interfering data stream to a first receiving device, wherein l is a positive integer; and a plurality of receiving devices including the first receiving device configured to: receive the data streams from the first transmitting device; solve aggregate interference for the data streams according to a pre-stored first equalization parameter and a pre-stored aggregate interference alignment quantization parameter, so as to obtain the aggregate interfering data stream from the data streams; and process the data streams according to a pre-stored second equalization parameter, a pre-stored interference parameter, and the aggregate interfering data stream, so as to obtain the $l^{th}$ data stream.

* * * * *